(12) United States Patent
Wraback et al.

(10) Patent No.: US 8,269,200 B2
(45) Date of Patent: Sep. 18, 2012

(54) TERAHERTZ RADIATION DEVICE AND METHOD OF GENERATING TERAHERTZ RADIATION

(75) Inventors: Michael Wraback, Germantown, MD (US); Paul H Shen, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 41 days.

(21) Appl. No.: 13/042,775

(22) Filed: Mar. 8, 2011

(65) Prior Publication Data
US 2011/0198515 A1 Aug. 18, 2011

Related U.S. Application Data

(63) Continuation of application No. 12/435,797, filed on May 5, 2009, now Pat. No. 7,919,764.

(60) Provisional application No. 61/050,890, filed on May 6, 2008.

(51) Int. Cl.
*H01L 33/04* (2010.01)
*H01L 33/28* (2010.01)
*H01L 33/32* (2010.01)

(52) U.S. Cl. .................... 250/504 R; 257/13

(58) Field of Classification Search ............. 250/504 R, 250/504 H, 493.1, 495.1; 257/12, 13
See application file for complete search history.

(56) References Cited

U.S. PATENT DOCUMENTS

| 7,335,908 B2 | 2/2008 | Samuelson et al. | |
| 7,919,764 B2 * | 4/2011 | Metcalfe et al. | 250/504 R |
| 2010/0195675 A1 * | 8/2010 | Moloney et al. | 372/4 |
| 2011/0012036 A1 * | 1/2011 | Gordon et al. | 250/493.1 |
| 2011/0180733 A1 * | 7/2011 | Wraback et al. | 250/504 R |

OTHER PUBLICATIONS

F. Bernardini, V. Fiorentini, and D. Vanderbilt. "Spontaneous polarization and piezoelectric constants of III-V nitrides," Phys. Rev. B 56(16), R10024-27 (1997).
D. Turchinovich, B. S. Monozon, and P. Uhd Jepson, "Role of dynamical screening in excitation kinetics of biased quantum wells: Nonlinear absorption and ultrabroadband terahertz emission," J. Appl. Phys. 99, 013510 (2006).
J. Wu, W. Walukiewicz; K. M. Yu, J. W. Ager III, E. E. Haller, H. Lu, W. J. Schaff, Y. Saito, and Y. Nanishi, "Unusual properties of the fundamental band gap of InN," Appl. Phys. Lett. 80, 3967 (2002).
G. Koblmüller, C. S. Gallinat, S. Bernardis, J. S. Speck, G. D. Chern, E. D. Readinger, H. Shen, and M. Wraback, "Optimization of the surface and structural quality of N-face InN grown by molecular beam epitaxy," Appl. Phys. Lett. 89, 071902 (2006).

(Continued)

Primary Examiner — Jack Berman
(74) Attorney, Agent, or Firm — Lawrence E. Anderson

(57) ABSTRACT

A method and device for generating terahertz radiation comprising a substrate; a plurality of segments of polar crystal material formed on the substrate, the segments having an internal electric polarization; each segment comprising at least two edges oriented substantially perpendicular to the polar axis such that the electric polarization terminates at the edges and the segment comprises a majority of positive charges on one edge and a majority of negative charges on the opposite edge thereby leading to creation of an internal electric field; whereby when irradiated by a pulsed source of duration less than one picosecond, electron-hole pairs are generated within the segments and the internal electric field separates and accelerates the electron-hole pairs to thereby produce terahertz radiation.

21 Claims, 35 Drawing Sheets

OTHER PUBLICATIONS

C. S. Gallinat, G. Koblmüller, J. S. Brown, S. Bernardis, J. S. Speck, G. D. Chern, E. D. Readinger, H. Shen, and M. Wraback, "In-polar InN grown by plasma-assisted molecular beam epitaxy." Appl. Phys. Lett. 89, 032109 (2006).

T. Takeuchi, S. Sota, M. Katsuragawa, M. Komori, H. Takeuchi, H. Amano, and I. Akasake, "Quantum-Confined Stark Effect due to Piezoelectric Fields in GaInN Strained Quantum Wells," Jpn. J. Appl. Phys., Part 2 36, L382 (1997).

F. Della Sala, A. DiCarlo, P. Luigi, F. Bernardini, V. Fiorentini, R. Scholz, and J.-M. Jancu, "Free-carrier screening of polarization fields in wurtzite GaN/InGaN laser structures," Appl. Phys. Lett. 74, 2002 (1999).

G. D. Chern, E. D. Readinger, H. Shen, M. Wraback, C. S. Gallinat, G. Koblmuller, and J. S. Speck, "Excitation wavelength dependence of terahertz emission from InN and InAs," Appl. Phys. Lett. 89, 141115 (2006).

K. Liu, J. Xu, T. Yuan, and X.-C. Zhang, "Terahertz radiation from InAs induced by carrier diffusion and drift." Phys. Rev. B 73, 155330 (2006).

D. Turchinovich, P. Uhd Jepsen, B. S. Monozon, M. Koch, S. Lahmann, U. Rossow, and A. Hangleiter, "Ultrafast polarization dynamics in biased quantum wells under strong femtosecond optical excitation." Phys. Rev. B 68, 241307 (R) (2003).

T. Tansky et al, "Optical Band Gap of Indium Nitride," J. Appl. Phys. 59, 3241 (1986).

Ahn, H. et al. "Intense terahertz emission from a-plane InN surface," Applied Physics Letters, vol. 92, Issue 10, id, 102103-1 to 102103-3 (2008).

S. Hoffman, et al., "Generation of Terahertz Radiation with Two Color Semiconductor Lasers," Laser & Photon. Rev. No. 1, 44-56 (2007).

A. Nahata, "Coherent Detection of Freely Propagating Terahertz Radiation By Electro-optic Sampling," App. Phys. Lett. 68 pp. 150-152 (Jan. 8, 1996).

D. H. Austin, "Picosecond optoelectronics switching and gating in silicon," Appl. Phys. Lett. 26, No. 3, pp. 101-103, (1975).

O. Ambacher, et al., "Pyroelectric properties of Al(In)GaN/GaN hetero- and quantum well structures," J. Phy. Condens. Matter 14 3399-3434 (2002).

J. Shan, et al. "Origin of magnetic field enhancement in the generation of terahertz radiation from semiconductor surfaces," Optics Letters, vol. 26, Issue 11, pp. 849-851 (Jun. 2001).

G.F. Neumark, "Theory of the Anomalous Photovoltaic Effect of ZnS," Physical Review, 125:838 (1962).

A.J. Grachev, et al., "On the macroscopic and microscopic origin of the photovoltaic effect in YBCO thin films," Physica C 288 (1997).

S. Juillaguet, et al. "Cathodoluminescence investigation of stacking faults extension in 4H-SiC," Physica Status Solida (A)204, No. 7, (2007) 2222-2228.

J.A. Majewski, et al., "Polarization and band offsets of stacking faults in AlN and GaN," MRS Internet, J. Nitride Semicond. Res. 3, 21 (1998).

J.A. Majewski, et al. Phys. Stat. Sol. "Novel Nitride Devices Based on Polarization Fields," A 179, 285 (2000).

M.D. Craven, et al. "Microstructural evolution of a-plane GaN grown on a-plane SiCby metalorganic chemical vapor deposition," Applied Physics Letters, vol. 84, No. 8 23 1281 (2004).

B.A. Haskell, et al. "Microstructure and enhanced morphology of planar nonpolar m-plane GaN grown by hydride vapor phase epitaxy," J. Electron. Mater. 34, 357 (2005).

M. Tani, et al., "Emission characteristics of photoconductive antennas based on low-temperature-grown GaAs and semi-insulating GaAs" Appl. Opt. 36, 7853 (1997).

K. Sakai editor, "Terahertz Optoelectronics, Topics Applied Physics," "Introduction to Terahertz Pulses," by Sakai, pp. 1-30 and "TerahertzRadiation From Semiconductor Surfaces," by Ping Gu, et al., pp. 63-97, published by Springer (2005).

H. Iwata, U. Lindefelt, S. Oberg. and P. R. Briddon, "Localized electronic states around stacking faults in silicon carbide," Phys. Rev. B 65(3), 033203 (2002).

M.B. Johnston, "Simulation of Terahertz Generation at Semiconductor Surfaces," Physical Review 8, vol. 65, 165301 (65 165301-1) (2002).

Z.W. Yan, "Intermediate-Coupling Polaron Properties in Wurtzite Nitride Semiconductors," Physics Letters A, vol. 326, Issues 1-2, pp. 157-165, May 31, 2004.

S. Juillaguet, et al., Screening the Built-in Electric Field in 4H SiC Stacking Faults, App. Phys. Letters 90, 11902 (2007).

\* cited by examiner

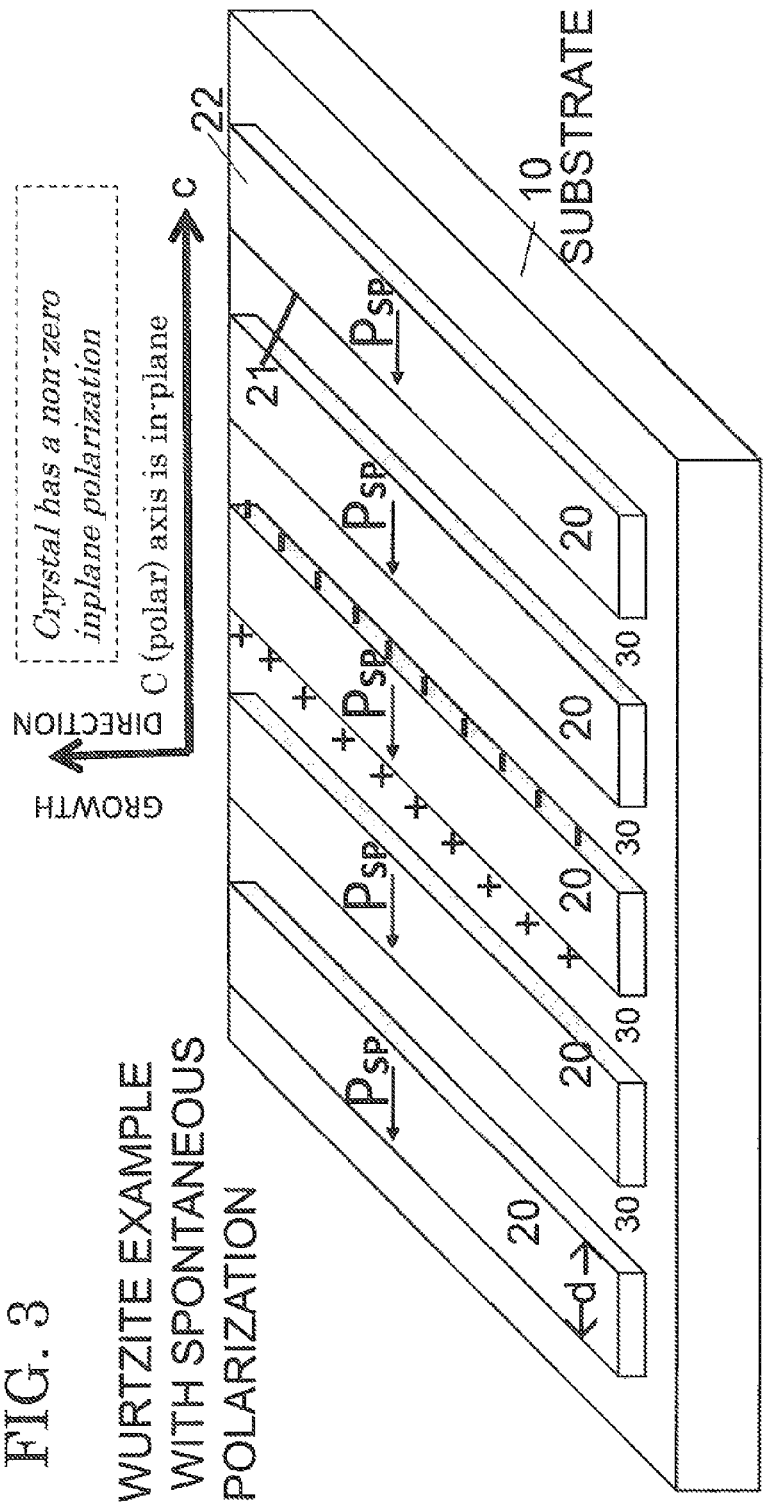

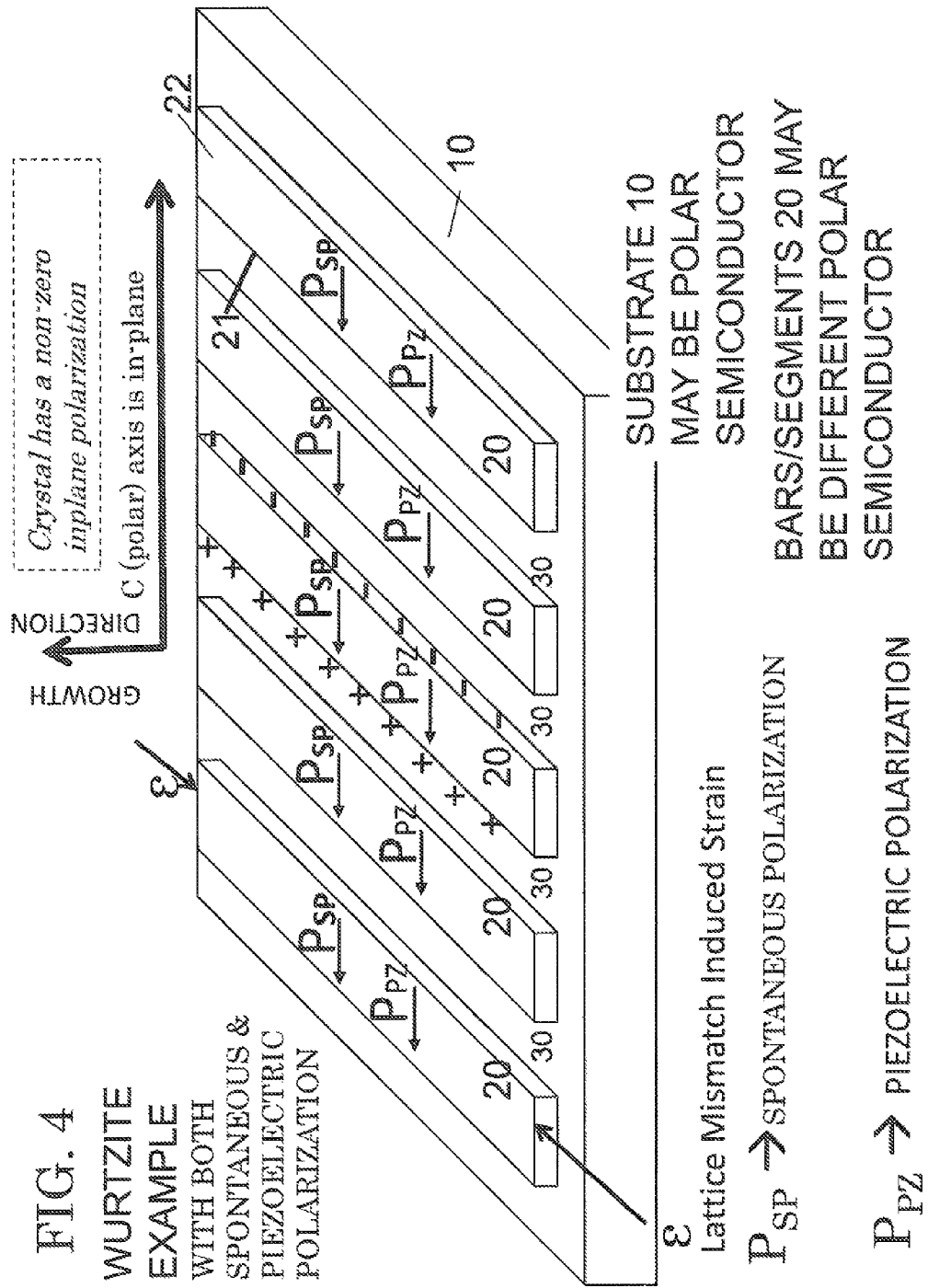

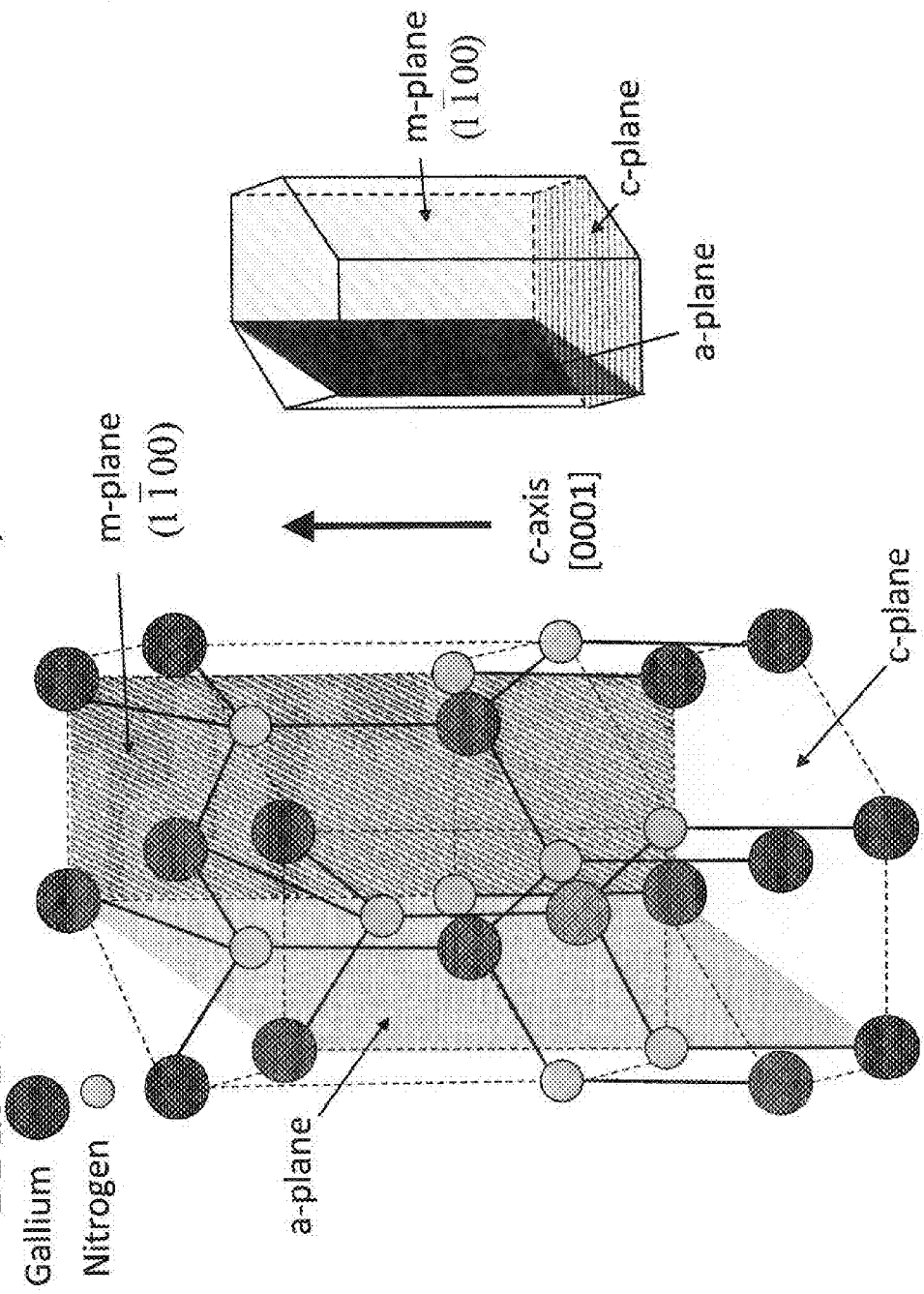

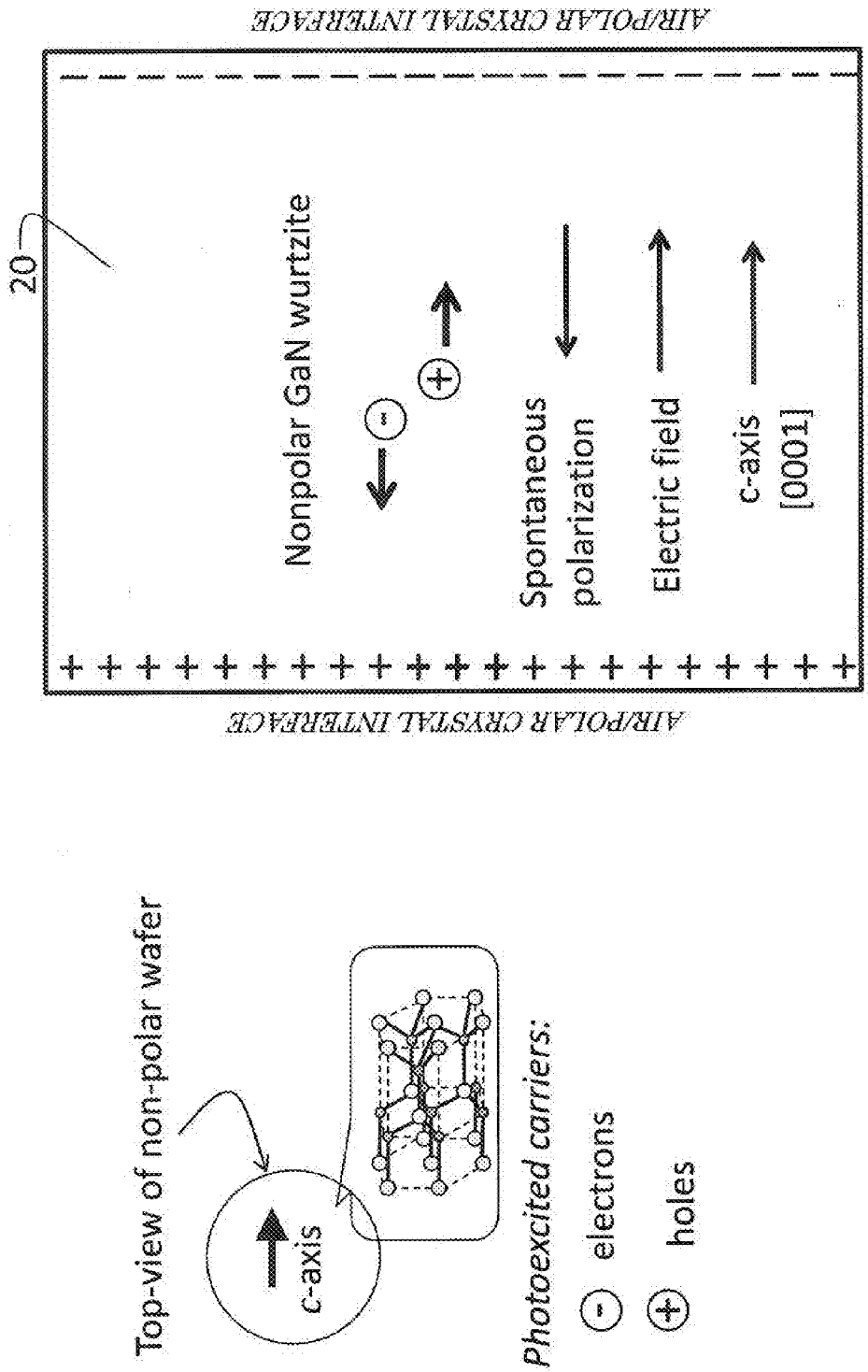
FIG. 15  ENLARGED SCHEMATIC VIEW OF ONE BAR/SEGMENT OF FIG. 3

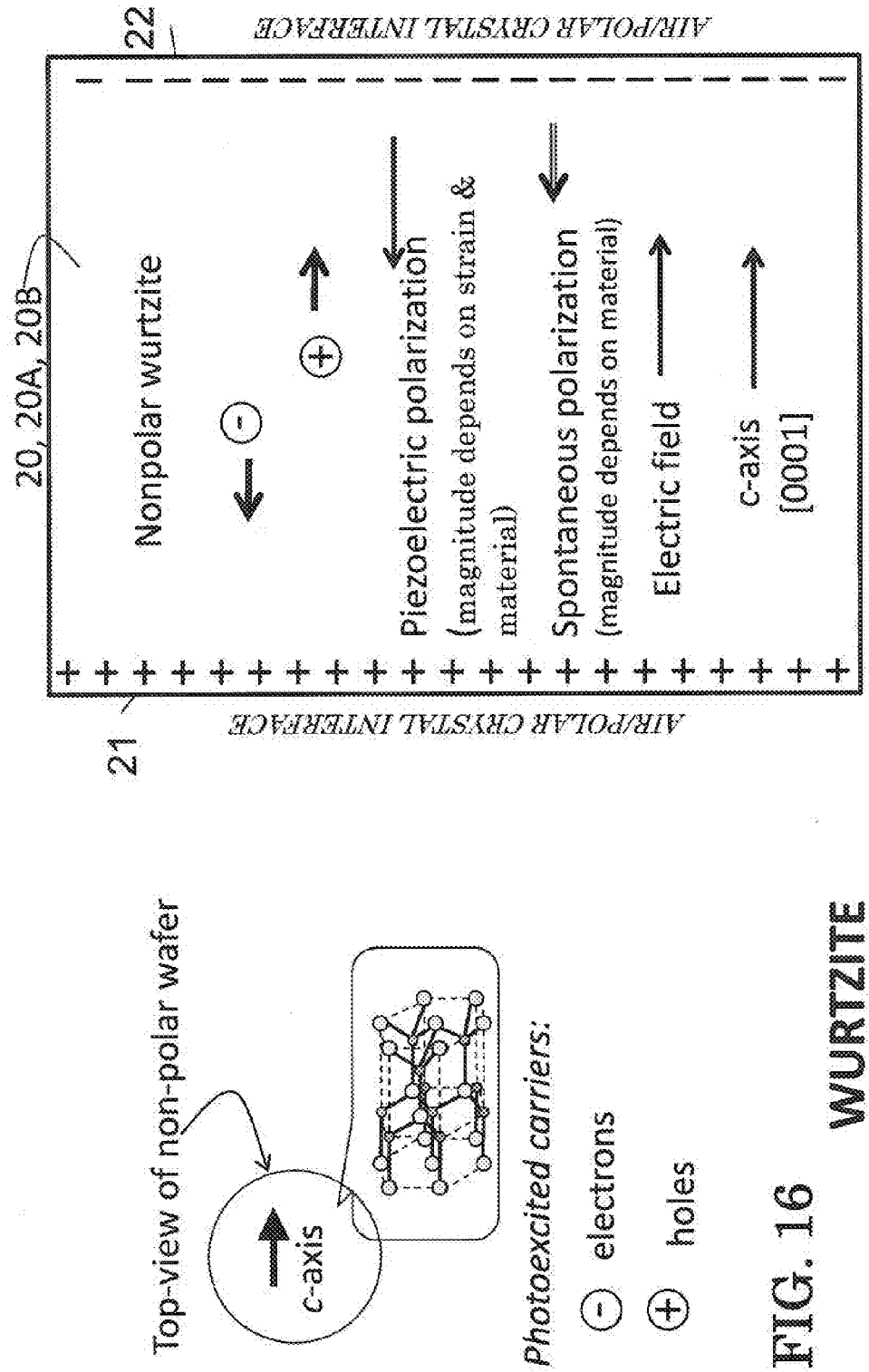
FIG. 16 WURTZITE
ENLARGED SCHEMATIC VIEW OF ONE BAR/SEGMENT OF FIGS. 4 and 5

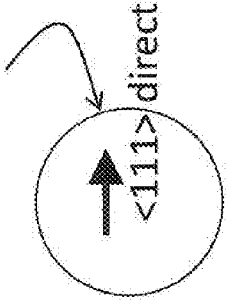
FIG. 17 ZINC BLENDE

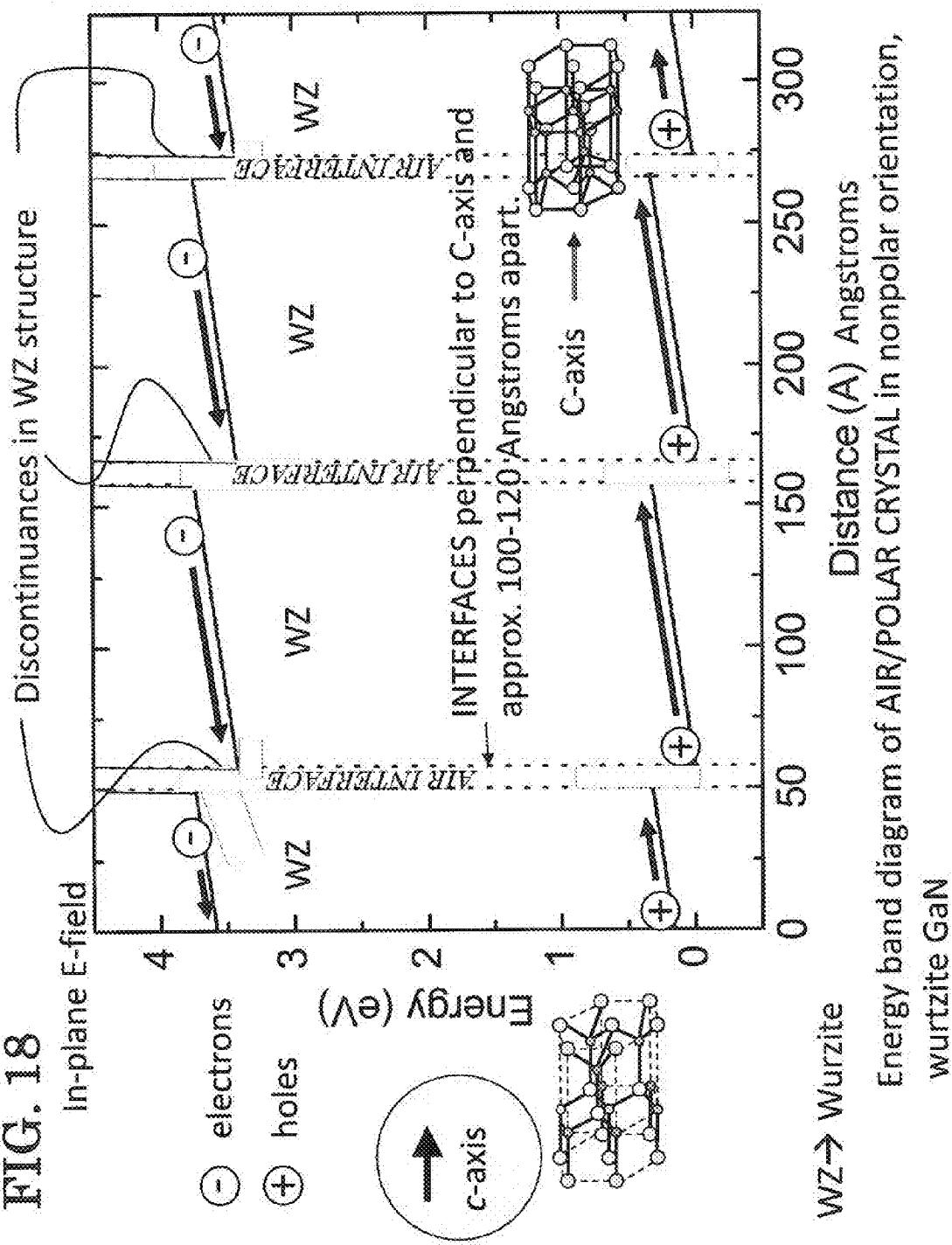

Example: Multiple quantum wells (MQWs)
THz from QWs
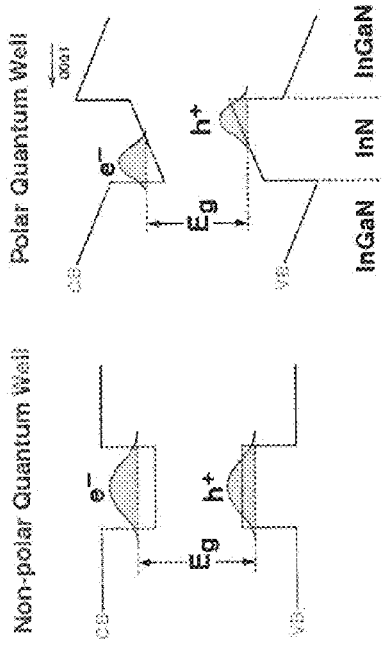
FIG. 19A
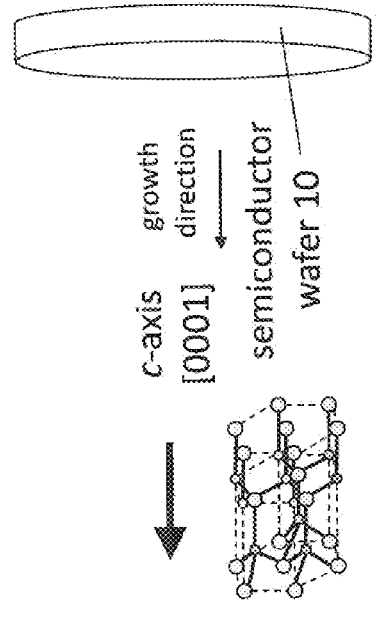
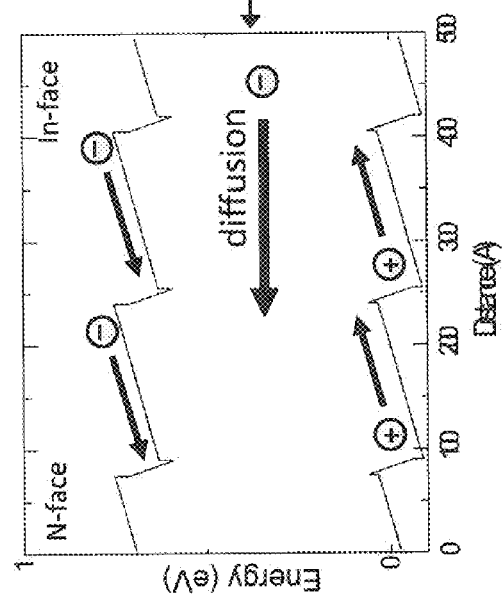
FIG. 19B

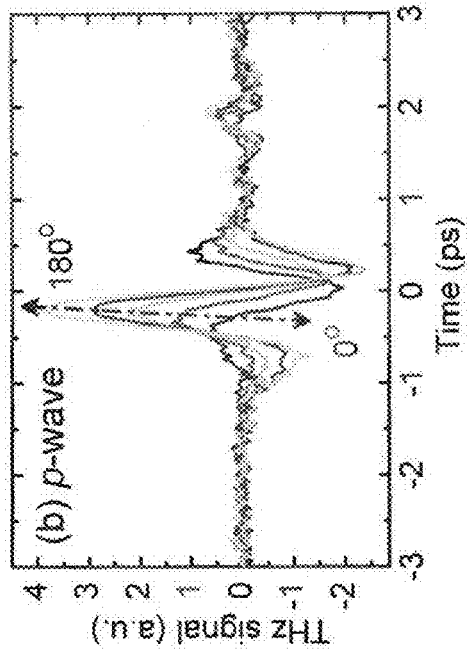

FIG. 25A

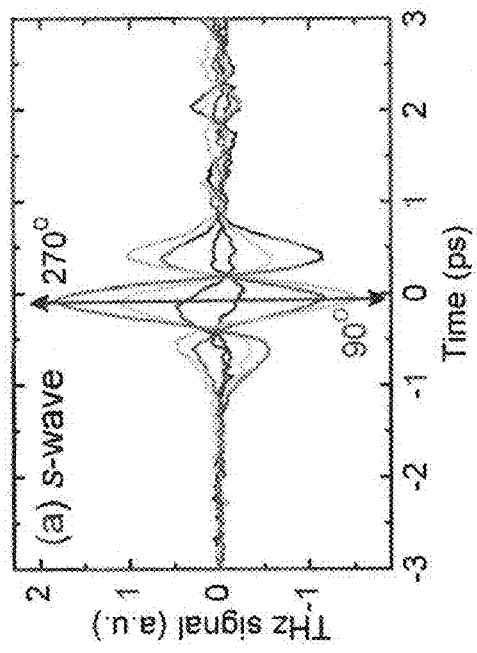

FIG. 25B

Time-resolved (A) s- and (B) p-polarized THz signal from the low carrier concentration m-GaN epilayer grown by MOCVD which has a stacking fault (SF) density of $1 \times 10^6$ cm$^{-1}$. Only the high SF-density sample with the largest THz radiation is shown. The samples are optically excited by femtosecond laser pulses at 266 nm Sample rotation angles ranging between from 0 to 360 degrees shown in color.

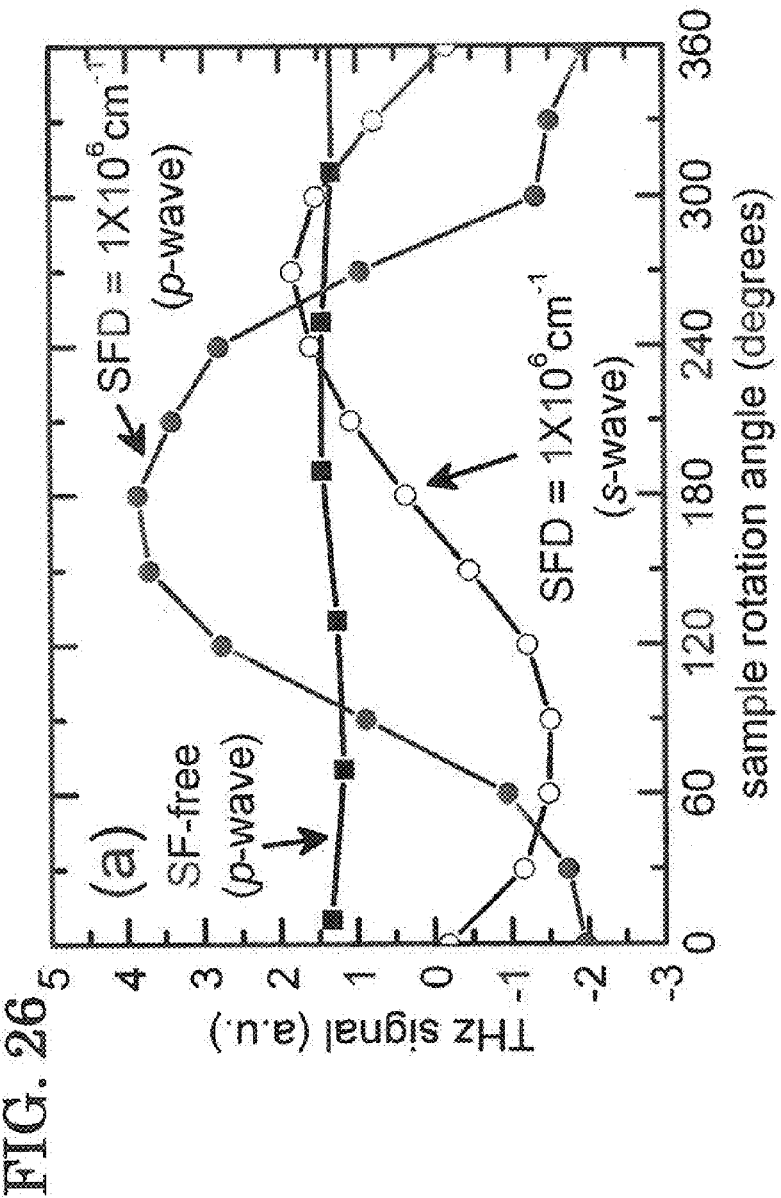
FIG. 26 (a) Sample rotation angle dependence of the peak THz signal amplitude from m-GaN, which has a SF-density of $1 \times 10^6$ cm$^{-1}$ (red and blue curves) and is stacking fault free (black curve).

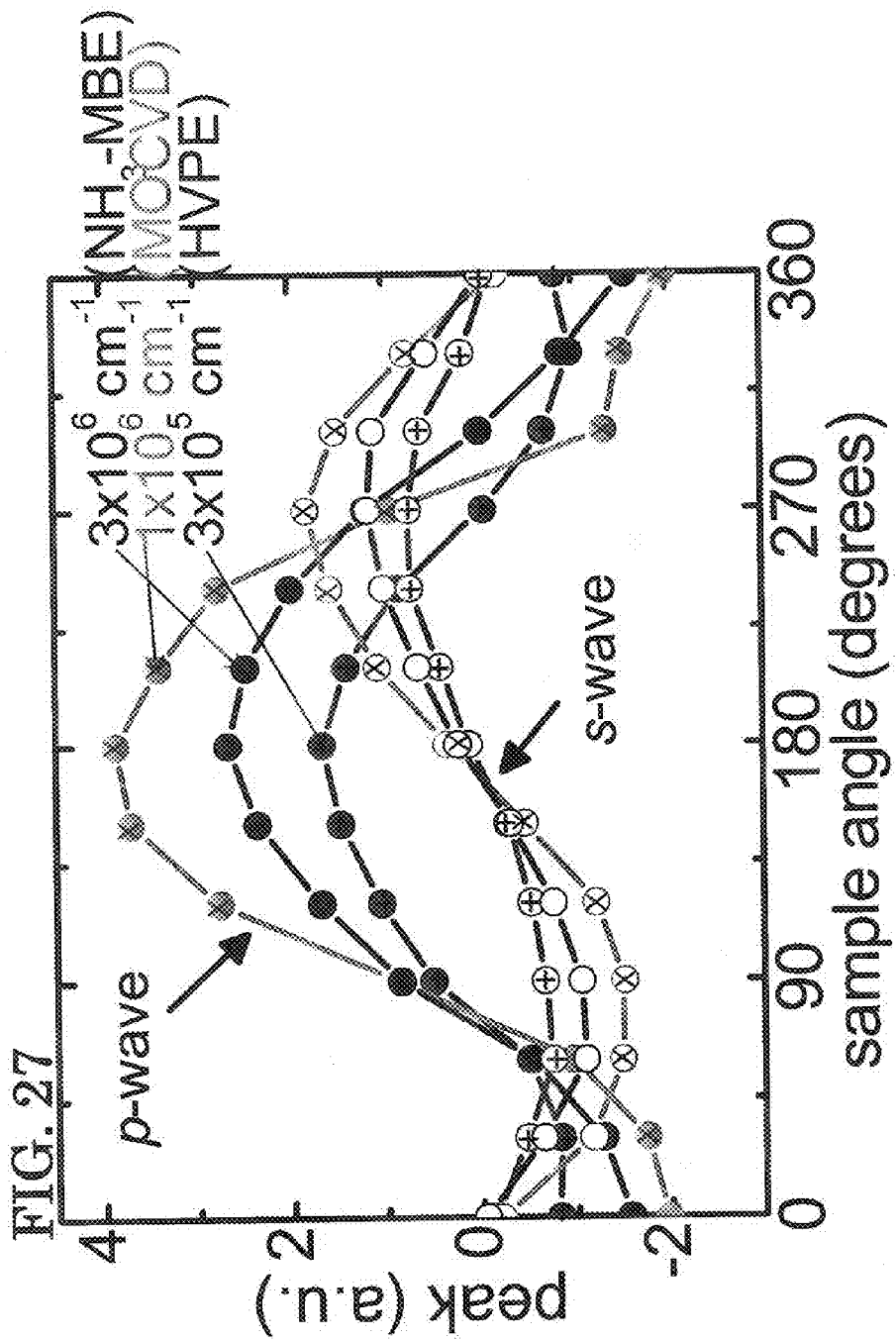

THz from m-plane InN

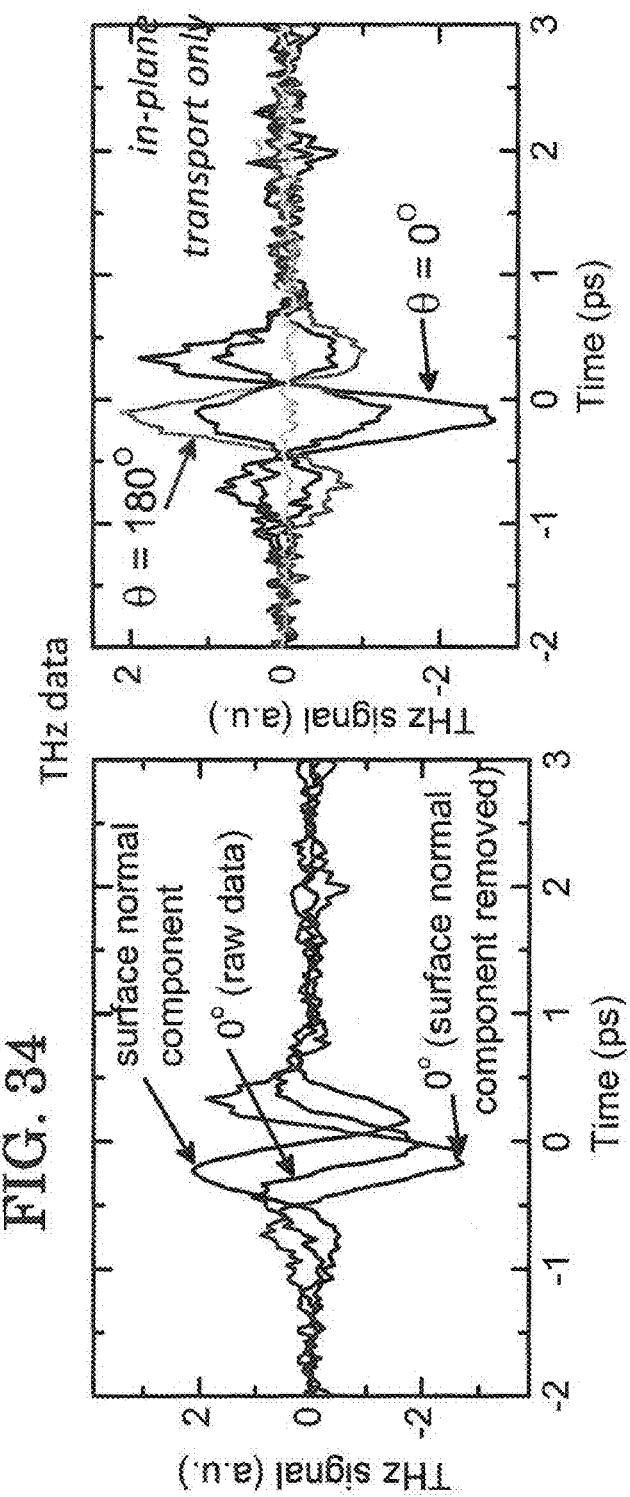
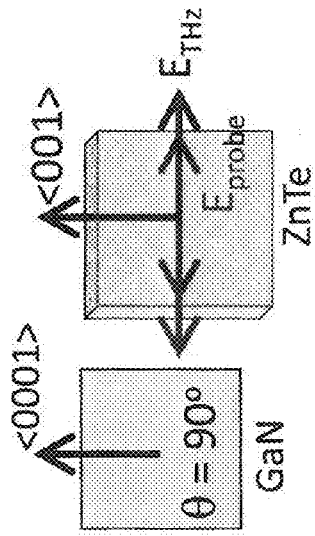
FIG. 34
- Phase and amplitude asymmetry *Surface normal transport only detection:* in *p*-polarization due to surface normal transport – can be separated out

TERAHERTZ RADIATION DEVICE AND METHOD OF GENERATING TERAHERTZ RADIATION

CROSS-REFERENCE TO RELATED APPLICATIONS

This application claims priority of U.S. application Ser. No. 12/435,797 entitled "Method and Apparatus for Enhanced Terahertz Radiation from High Stacking Fault Density," filed May 5, 2009, by Dr. Grace Metcalfe, et al., and U.S. Provisional Application No. 61/050,890 filed May 6, 2008. Both U.S. application Ser. Nos. 12/435,797 and 61/050,890 are hereby incorporated herein by reference.

GOVERNMENT INTEREST

The invention described herein may be manufactured, used, and/or licensed by or for the United States Government.

FIELD OF THE INVENTION

This invention relates generally to radiation emitting crystals, and more particularly to crystal structures which provide a source of electromagnetic radiation.

BACKGROUND OF THE INVENTION

Electromagnetic waves sent at terahertz frequencies, known as terahertz radiation, terahertz waves (THz) rays, occur in the region of the electromagnetic spectrum between 100 gigahertz ($1 \times 10^{11}$ Hz) and several terahertz, and correspond to the wavelength range of from roughly a single digit millimeter (high-frequency edge of the microwave band) and roughly 100 micrometer (long-wavelength edge of far-infrared light).

THz-rays, which are shorter than microwaves and longer than infrared, have potential usage in biomedical and security applications in that THz-rays are safe, and non-ionizing, and can pass through such materials as clothing, paper, cardboard, wood, masonry, plastic, ceramics, as well as penetrate fog and clouds. THz radiation is safe for biological tissues (unlike X-rays), and images can be formed with terahertz radiation having resolution of less than 1 mm. THz radiation has potential spectroscopic uses in that while many materials are transparent to THz, many materials exhibit unique spectral identifiers when exposed to terahertz radiation, including explosives, pharmaceuticals, and illegal narcotic substances. Accordingly, items of interest can be observed through normally visually opaque intervening layers, such as packaging and clothing. For example, airport security scanners may use terahertz radiation.

To date, THz rays have not yet been widely used, partly because of the difficulty in producing them at sufficient intensity. For example, in the journal article entitled, "Generation of Terahertz Radiation with Two Color Semiconductor Lasers," Hoffman and Hoffman, Laser and Photonics Reviews, Rev. 1, No. 1, 44-56 (available on-line Feb. 13, 2007) (hereinafter Hoffman & Hoffman) though time-domain THz spectroscopy has been shown to be extremely powerful, it suffers from its enormous price (at least $ 200,000) and complexity, which restricts the use of the system.

DESCRIPTION OF THE RELATED ART

Previous approaches to terahertz radiation devices have used photoconductive switches in conjunction with a semiconductor comprising two parallel metal strips on the surface separated by a small distance (hundreds of microns to a few millimeters). A schematic illustration of such a configuration is shown in FIG. 1. These metal strips act as electrodes, across which a large voltage (up to kV) is applied, creating electric fields as large as 10 kV/cm. The semiconductor material is highly resistive, such that virtually no current flows without illumination. When the gap between the electrodes is illuminated with an approximately 100 femtosecond pulse of photon energy larger than the fundamental bandgap of the semiconductor, electron-hole pairs are created and swept out in the high field, producing a transient current that generates a THz pulse with usable bandwidth beyond 1 THz. The energy of the THz pulse is proportional to the square of the bias field. One disadvantage of this approach is that metal electrodes with kV voltages across them must be used to create THz radiation. Another disadvantage is that the external bias voltage, and therefore the THz pulse energy, is limited by dielectric breakdown in air to less than 300 kV/cm in theory, but in practice 100 kV/cm is rarely exceeded. Terahertz (THz) radiation in conventional devices is commonly generated through in-plane carrier acceleration in electric fields utilizing externally biased photoconductive (PC) switches, a surge-current normal to the surface due to a built-in surface field, or the photo-Dember field. Although the geometry of the biased photoconductive antennas is more favorable for coupling out the THz radiation than that for other semiconductor-based THz sources employing transport normal to the surface, these photoconductive switches require electrode processing and an external bias voltage, which is limited by the dielectric strength of air, to establish an in-plane electric field. An alternative optical THz generation approach creates narrow band radiation through the mixing of continuous-wave (CW) lasers separated in frequency by the desired terahertz difference frequency in a semiconductor photomixer. Most photomixers use low-temperature grown GaAs thin films as the active layer due to its short carrier lifetime (approximately 0.5 ps), large breakdown-field threshold (>300 kV/cm) and high carrier mobility (~200 $cm^2/V \cdot s$).

THz emission from quantum wells (QWs) (see FIG. 19A) has been observed from GaAs/AlGaAs single QWs and multiple quantum wells (MQWs), InGaAs/GaAs and GaSb/AlSb MQWs and superlattices, low indium concentration InGaN/GaN (MQWs), and high indium concentration InN/InGaN MQWs. While the THz radiation field is proportional to the number of photoexcited carriers under low excitation conditions, one can readily gauge the importance of the enhanced internal electric field by considering the MQW structure as a nanoscale capacitor, with the energy transfer from the excitation pulse to the THz pulse mediated by the partial or complete discharge of the nanocapacitor. Therefore the maximum THz pulse energy is limited by the electrostatic energy stored in the nanocapacitor, $U = \frac{1}{2} \epsilon \epsilon_0 A d F^2$, where $\epsilon \epsilon_0$ is the static permittivity, A is the area, d is the effective width of the capacitor, and F is the electric field inside the capacitor.

SUMMARY OF THE INVENTION

In consideration of the problems described above, an object of the present invention is to provide a method and device for generation of terahertz (THz) radiation that will provide significantly more terahertz power than that which can be obtained using current state of the art photoconductive switches. In a preferred embodiment, a polar crystal material is excited by an emission source, such as for example, a 100 femtosecond pulse source. The polar crystal material may have interstices, gaps, openings, or breaks between segmented portions. The interstices, gaps, breaks or openings may be produced by etching the polar crystal along a nonpolar direction to create high internal fields that result from, inter alfa, termination of, the spontaneous polarization (and/or piezoelectric polarization) along the in-plane c-axis of the polar crystal material. Such interstices, gaps, openings or breaks may be created, for example, during the course of the heteroepitaxial growth of the crystals on non-native substrates, whereby large numbers (in the range of $10^3$ to $10^7$ per cm) of these interstices, gaps, openings or breaks are created, such as by masking, primarily perpendicular to the polar c-axis. The internal electric fields created by the interstices, gaps, openings or breaks can exceed those that can be obtained using large externally applied voltages in conventional, large aperture photoconductive switches, which are constrained by dielectric breakdown in air. Unlike photoconductive strips, the present invention does not require metal contacts. Moreover, the present invention requires no external voltage source. In a preferred embodiment, the interstices, gaps, openings or breaks may be substantially equally spaced. As shown in FIGS. 3-7, the polar crystal segments or portions 20 may be in the form of polygons having interstices or spaces 30 there between. The polar crystal segments may use a polar crystal material having a Wurtzite crystal structure as depicted in FIGS. 3-5, or a zinc blende crystal structure as depicted in FIGS. 6 and 7. As used herein, the terminology "wurtzite" refers to the wurtzite crystal structure, named after the mineral wurtzite, which is a crystal structure for various binary compounds. In the case of zinc blende, there is relatively insignificant spontaneous polarization, so only piezoelectric polarization is depicted in FIGS. 6 and 7. The segments may be formed of GaN, InN, AlN and alloys thereof, ZnO, MgO, ZnS, ZnSe, ZnTe, and alloys thereof, and SiC. These materials can be used as represented by FIGS. 3-5. Zinc Blende compounds can be used, as represented by the embodiments of FIGS. 6 and 7. The Zinc Blende compounds which could be utilized include zinc blende GaAs, InAs, AlAs, GaN, InN, AlN, GaSb, AlSb, InSb or alloys thereof, ZnO, MgO, ZnS, ZnSe, ZnTe, and alloys thereof, and SiC. Other crystal structures may be used to form the segments 20 without departing from the scope of the invention. The polar crystal segments may be in the form of multiple layers, represented by segments 20A and 20B in FIGS. 5 and 7. The multiple layered segments may be made of the abovementioned materials, and the adjacent layer may be strained (i.e., one lattice is forced to conform to another) thereby creating a piezoelectric polarization in addition to the spontaneous polarization.

Polar crystal materials, which may be semiconductors, developed using the principles of the present invention use nonpolar growth directions to create in-plane spontaneous and piezoelectric polarizations that are terminated at interstices, gaps, openings or breaks to produce large in-plane internal electric fields within the segmented portions. The interstices, gaps, breaks, or openings in the polar crystal may be filled with air, exist in a vacuum, or may be filled with a different material (such as an insulator or other semiconductor material).

The polar crystal material layer constructed in accordance with the principles of the present invention can be GaN, InN, AlN, or alloys thereof.

Further examples of the polar crystal material layer are ZnO, MgO, ZnS, ZnSe, ZnTe, or alloys thereof. GaAs, InAs, AlAs, GaSb, AlSb, GaN alloys thereof may also be used. In addition, SiC may be utilized as the polar crystal material layer. The orientation of the crystal structure may be nonpolar with, in the case of wurtzite structures, the a-plane or m-plane as the growth plane. Although in FIGS. 3-7, the polar axis is shown as being in-plane (or in the growth plane), the crystal structure orientation may be semipolar, where a projection of the polar axis is in the growth plane, as shown for example in FIG. 9.

The present invention results in spectrally broadened emission and greater efficiency of emitting devices. As described in greater detail in U.S. application Ser. No. 12/435,797 (hereinafter '797 Application) entitled "Method and Apparatus for Enhanced Terahertz Radiation for High Stacking Fault Density," the interruption of the polarization in the polar crystal material may be produced or created using stacking faults. In other words, the stacking faults perform the function of the interstices, openings, or breaks referenced above. As described further in the '797 Application, the p-polarized (s-polarized) THz radiation measured from the high stacking fault density samples reaches its maximum and minimum when the c-axis is parallel or antiparallel with the p-polarization (s-polarization) detection direction, respectively. A preferred method provides a stacking fault density in the approximate range of $10^3$ to $10^7$ per centimeter producing an average electric field in the approximate range of 3 to 1800 kV/cm.

A preferred embodiment device for generating terahertz radiation comprises: a substrate; a plurality of segments of polar crystal material formed on the substrate, the segments having an internal electric polarization; each segment comprising at least two edges oriented substantially perpendicular to the polar axis such that the electric polarization terminates at the edges and the segment comprises a majority of positive charges on one edge and a majority of negative charges on the opposite edge thereby leading to creation of an internal electric field; whereby when irradiated by a pulsed source of duration less than one picosecond, electron-hole pairs are generated within the segments and the internal electric field separates and accelerates the electron-hole pairs to thereby produce terahertz radiation.

In order to attain the objectives described above, according to the present invention, there is provided an apparatus and methodology whereby enhanced levels of terahertz radiation are obtainable.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings:

FIG. 3 is a schematic illustration of a preferred embodiment comprising a substrate 10 having formed thereon segments 20 of a polar crystal structure having a wurtzite crystal structure wherein the spontaneous polarization is in the growth plane.

FIG. 4 is a schematic illustration of a preferred embodiment comprising a substrate 10 having formed thereon segments 20 of a polar crystal material having a wurtzite crystal structure wherein there is a lattice mismatch between the segments 20 of the polar crystal material and the substrate such that both the piezoelectric and spontaneous polarizations are in the growth plane.

FIG. 14 is a depiction of the crystal lattice structure for GaN showing the c-plane, c-axis, a-plane and m-plane, as further exemplified in the hexagonal lattice structure depicted on the right.

FIG. 15 is a schematic illustration showing an enlarged view of one segment 20 of FIG. 3 with the spontaneous polarization in the growth plane. The buildup of charge at the boundaries (or air interfaces) establishes an electric field in the [0001] direction and carriers excited by a femtosecond optical pulse drift in the internal electric field.

FIG. 16 is a schematic illustration showing an enlarged view of one segment 20, 20A or 20B of FIGS. 4 and 5 with the spontaneous and piezoelectric polarizations in the growth plane. The buildup of charge at the boundaries (or air interfaces) establishes an electric field in the [0001] direction and carriers excited by a femtosecond optical pulse drift in the internal electric field.

FIG. 17 is a schematic illustration depicting an enlarged view of one zinc blende segment 20, 20A or 20B of FIGS. 6 and 7; showing the piezoelectric polarization in the growth plane. The buildup of charge at the boundaries (or air interfaces) establishes an electric field in the <111> direction and carriers excited by a femtosecond optical pulse drift in the internal electric field.

FIG. 18 is an energy band diagram of the discontinuity at the air/polar material interface.

FIG. 19A is a depiction of polar and nonpolar quantum wells associated with an InGaN/InN/InGaN structure.

FIG. 19B is a depiction of combined drift and diffusive transport in a polar multiple quantum well structure.

FIG. 20 shows measurements using an excitation wavelength of 266 nm. FIG. 20 also illustrates the terahertz emission from SF-free m-plane GaN at various sample rotation angles and shows no sample rotation angle dependence of the terahertz emission, consistent with terahertz emission due to surface normal photocurrents.

FIG. 21 shows measurements using an excitation wavelength of 350 nm. There is a diminished terahertz signal from the SF-free sample at the longer excitation wavelength due to less excess electron energy and increased absorption depth. The SF component may be isolated by choosing the right excitation wavelength or by using quantum wells or other heterostructures to restrict surface normal transport.

FIG. 25A illustrates graphically time-resolved s-wave THz signals from an m-plane GaN epilayer grown by MOCVD which has a stacking fault (SF) density of $1 \times 10^6$ cm$^{-1}$, under 266 nm excitation, at sample rotation angles ranging between 0° to 360°.

FIG. 25B illustrates graphically time-resolved p-wave THz signals from an m-plane GaN epilayer grown by MOCVD which has a stacking fault (SF) density of $1 \times 10^6$ cm$^{-1}$, under 266 nm excitation, at sample rotation angles ranging between 0° to 360°. The p-wave terahertz signal shows phase and amplitude asymmetry due to surface normal transport.

FIG. 26 graphically illustrates the sample rotation angle dependence of the peak THz signal amplitude from an m-plane GaN epilayer, which has a SF-density of $10^6$ cm$^{-1}$ (solid circles denote p-wave curve and white circles denote s-wave curve) and is stacking fault free (square blocks).

FIG. 27 is a graphical illustration of p-wave and s-wave THz signal emission versus sample angle degrees from m-plane GaN samples with a SFD of $3 \times 10^5$ cm$^{-1}$, $1 \times 10^6$ cm$^{-1}$, and $3 \times 10^6$ cm$^{-1}$. The smaller THz signal from sample with a SFD of $3 \times 10^6$ cm$^{-1}$ may be due to screening by background carriers, decreased absorption with increased field and reduced sample thickness, or smaller dipole.

FIG. 34 illustrates how the time-resolved THz signal component due to surface normal transport can be separated out. FIG. 34 shows time-resolved p-polarized THz wave signal from the high SF-density m-plane GaN (a) at 0° sample rotation before and after subtraction of the surface normal transport component and (b) at sample rotation angles ranging from 0° to 360° after subtraction of the surface normal transport component. FIG. 26 may be juxtaposed to show sample rotation angle dependence of the peak p-and s-polarized THz emitted electric field from m-plane GaN (stacking fault density =$1 \times 10^6$ cm$^{-1}$). The p-polarized THz signal has been corrected for surface normal transport.

DETAILED DESCRIPTION OF THE PREFERRED EMBODIMENTS

Figure 1:
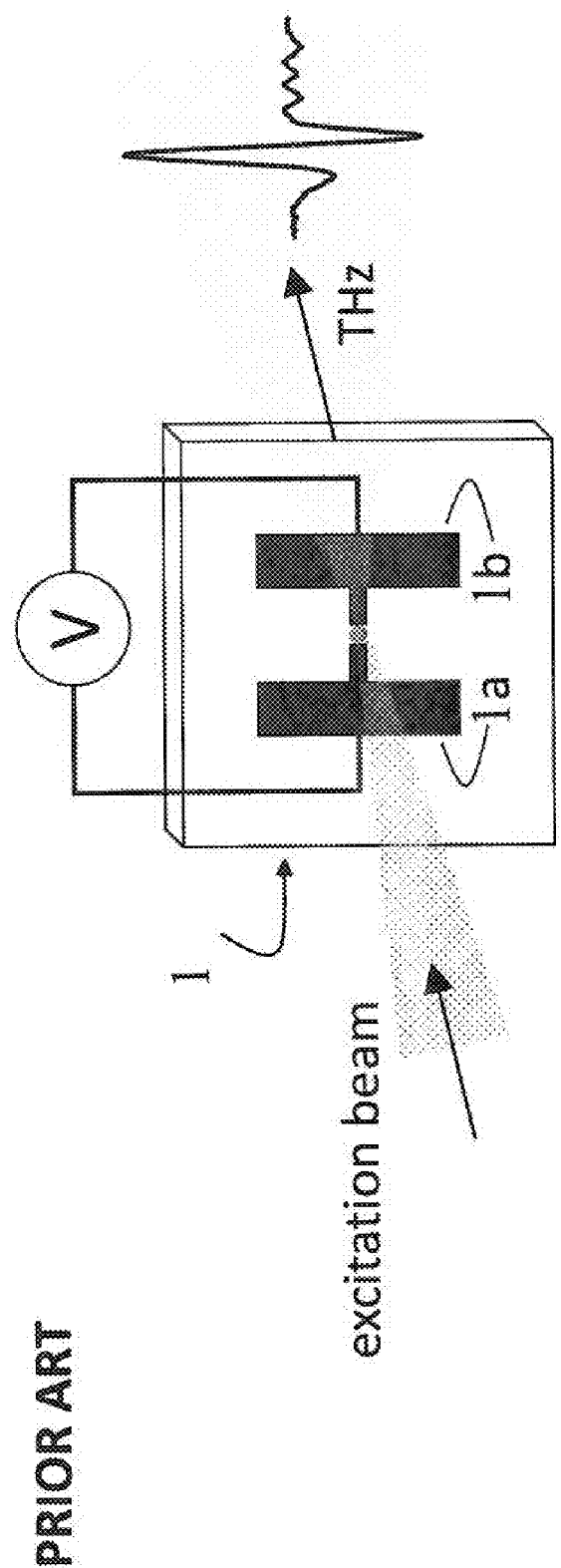
FIG. 1 is an illustration of a prior art photoconductive switch device for producing terahertz radiation.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, an etched region illustrated as a rectangle will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

The present invention provides, inter alfa, a new source of terahertz radiation that will provide significantly more terahertz power when excited by a femtosecond laser pulse than that which can be obtained using current state-of-the-art photoconductive switches. This is accomplished by engineering higher internal electric fields in the device than can be obtained using large, externally applied voltages in conventional, large aperture photoconductive switches, which are constrained by dielectric breakdown in air. The present invention is therefore also easier to fabricate because it does not require metal contacts. Previous approaches have used a photoconductive switch comprised of a semiconductor with two parallel metal strips on the surface separated by a small distance (hundreds of microns to a few millimeters). These metal strips act as electrodes, across which a large voltage (up to a kV) is applied, creating electric fields as large as 10 kV/cm. The semiconductor material is highly resistive, such that virtually no current flows without illumination. When the gap between the electrodes is illuminated with a ~100 femtosecond pulse of photon energy larger than the fundamental bandgap of the semiconductor, electron-hole pairs are created and are swept out in the high field, producing a transient current that generates a THz pulse with useable bandwidth beyond 1 THz. The energy of the THz pulse is proportional to the square of the bias field.

One disadvantage of this approach is that metal electrodes with kV voltages across them must be used to create the THz radiation. While these voltages can be limited by reducing the gap spacing using metal-semiconductor-metal (MSM) structures with interdigitated fingers, in this case the fields in adjacent gaps would be opposite, leading to a cancellation of the THz radiation. This can be addressed by using a shadow mask to eliminate the response of every other gap, thus ensuring that all of the fields in the remaining gaps are additive, but this will also reduce efficiency by lowering the effective illuminated area by as much as a factor of 4. Another disadvantage is that the external bias voltage, and therefore the THz pulse energy, is limited by dielectric breakdown in air to less than 30 kV/cm in theory, but in practice 10 kV/cm is rarely exceeded.

Figure 2A:
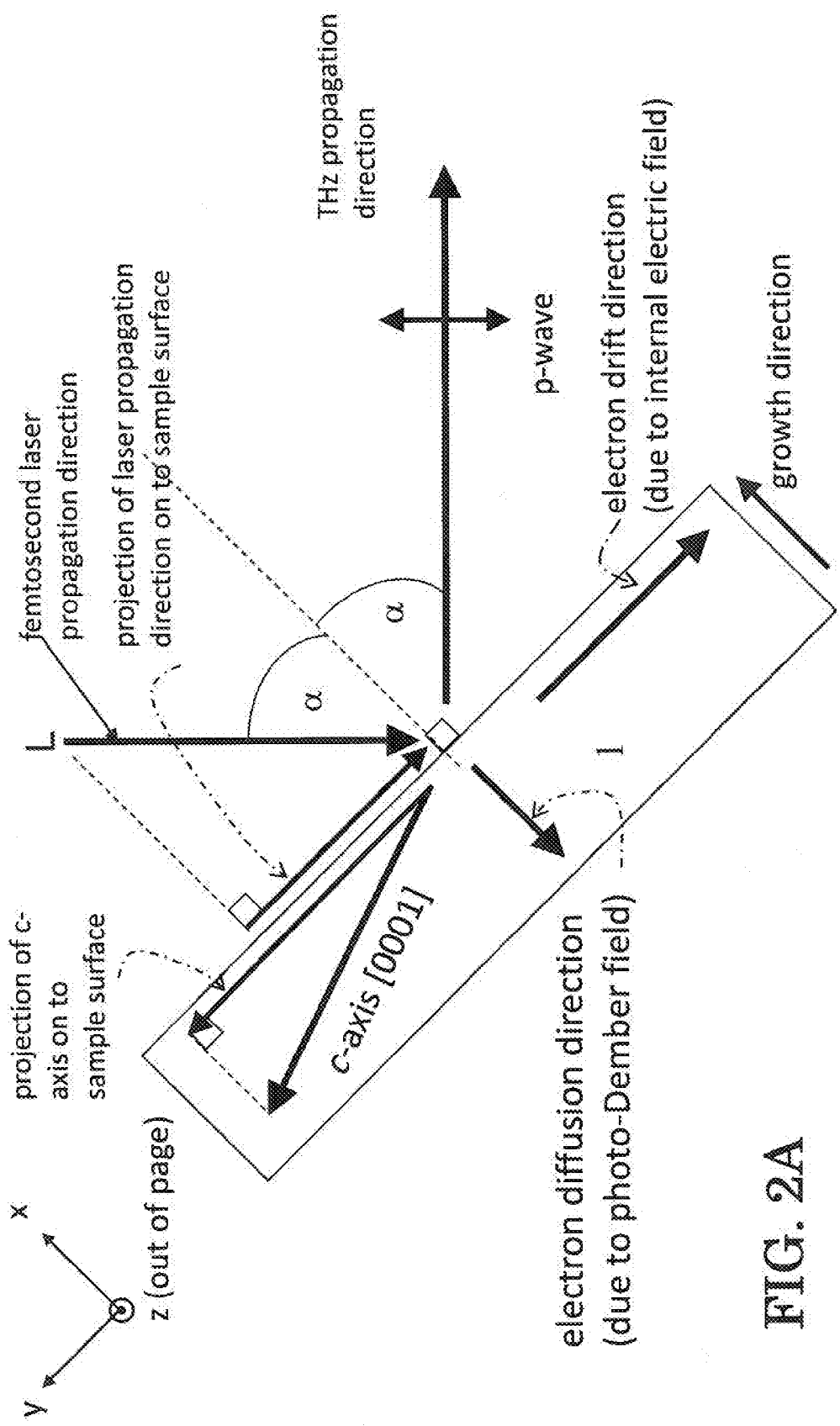
FIG. 2A illustrates a preferrred embodiment orientation of a femtosecond pulsed laser source relative to a semiconductor crystal, and the terahertz beam produced by the reflected wave.
Figure 2B:
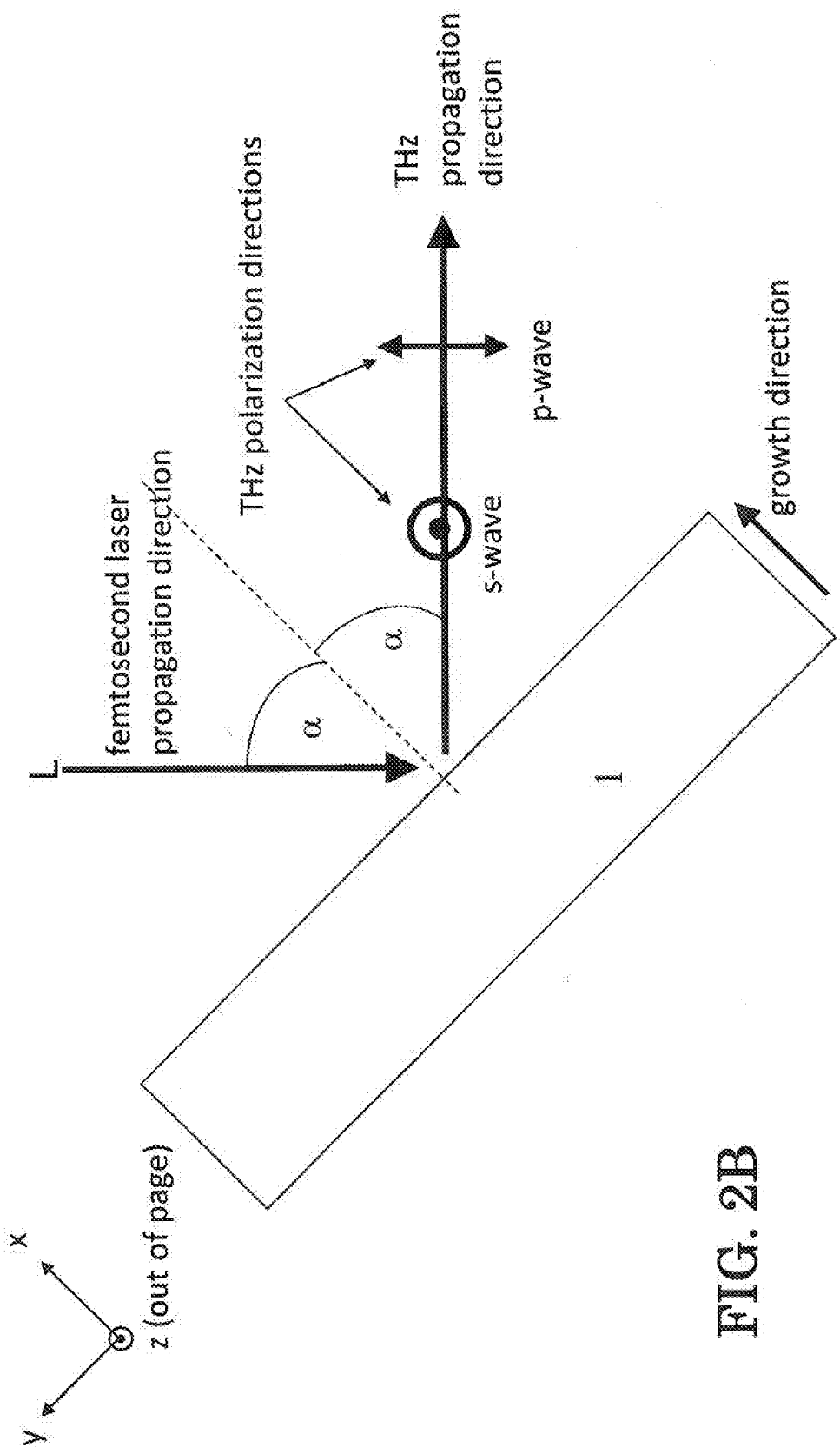
FIG. 2B illustrates the p-wave and s-wave orientations. The term p-wave and s-wave refers to the polarization parallel and perpendicular to the plane of incidence, respectively. Both polarizations demonstrate a sin θ dependence on sample rotation angle θ, but with a 90° shift between the polarizations.

The present invention relates to Terahertz (THz) emission by a polar crystal upon excitation by a femtosecond laser source as shown schematically in FIG. 2A. FIG. 2B illustrates the directions of the p-polarized and s-polarized components of the terahertz waveform produced by laser excitation of the semiconductor crystal structure 1. As recognized by those of ordinary skill in the art, a femtosecond is $10^{-15}$ seconds and a femtosecond laser is a laser that operates in the domain of femtoseconds. The most preferable excitation source, labeled L in FIGS. 2A, 2B, is a low cost, compact, femtosecond fiber laser operating at either 1030 nm or 1560 nm (fundamental), or 515 nm or 780 nm (second harmonic). Preferably the pulsed radiation source has a photon energy greater than the bandgap of the crystal material. During photo excitation, a photo-Dember field can occur at the surface of a semiconductor due to a difference in diffusion coefficients for electrons and holes, and a structural asymmetry. Typically, electrons have a larger diffusion coefficient than holes. Consequently, upon photoexcitation, electrons diffuse more rapidly than the holes. In the absence of a surface boundary, no net dipole field is observed, since the center of charge does not change.

One aspect of the present invention is the recognition of polarized terahertz (THz) emission from nonpolar GaN, or the like, due to carrier transport in internal in-plane electric fields created by the termination, at boundaries (or edges), of the in-plane polarization. Observation of a flip in the THz waveform polarity with a reversal in c-axis orientation indicates a reversal of photoelectric charge acceleration direction, consistent with built-in electric field along the c-axis in the nonpolar nitride semiconductor. This polarized THz emission, for horizontal c-axis, can lead to significant enhancement of the THz radiation usually observed due to carrier diffusion normal to the sample surface, In order to derive the THz electric field radiated, the first derivative of the net current with respect to time or the second derivative of the polarization, is calculated as a function of time. It acts as the source term in Maxwell's equations when determining the THz emission.

Figure 8:
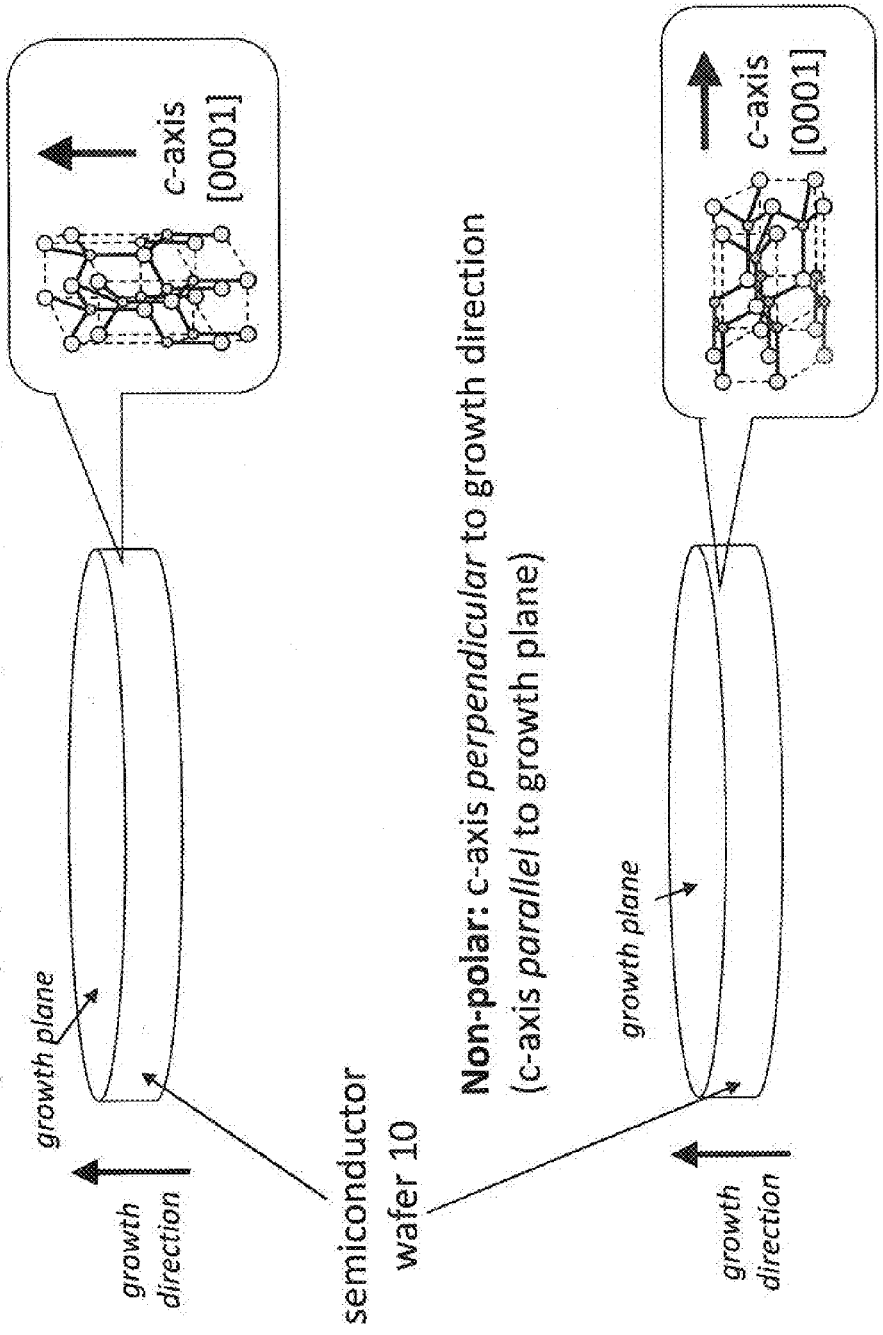
FIG. 8 illustrates a comparison of the relative orientations of the crystal structure for polar and nonpolar wurtzite materials; and in particular, the orientation of the c-axis relative to the growth plane and growth direction. Non-polar orientation occurs when the c-axis is parallel to the growth plane.
Figure 9:
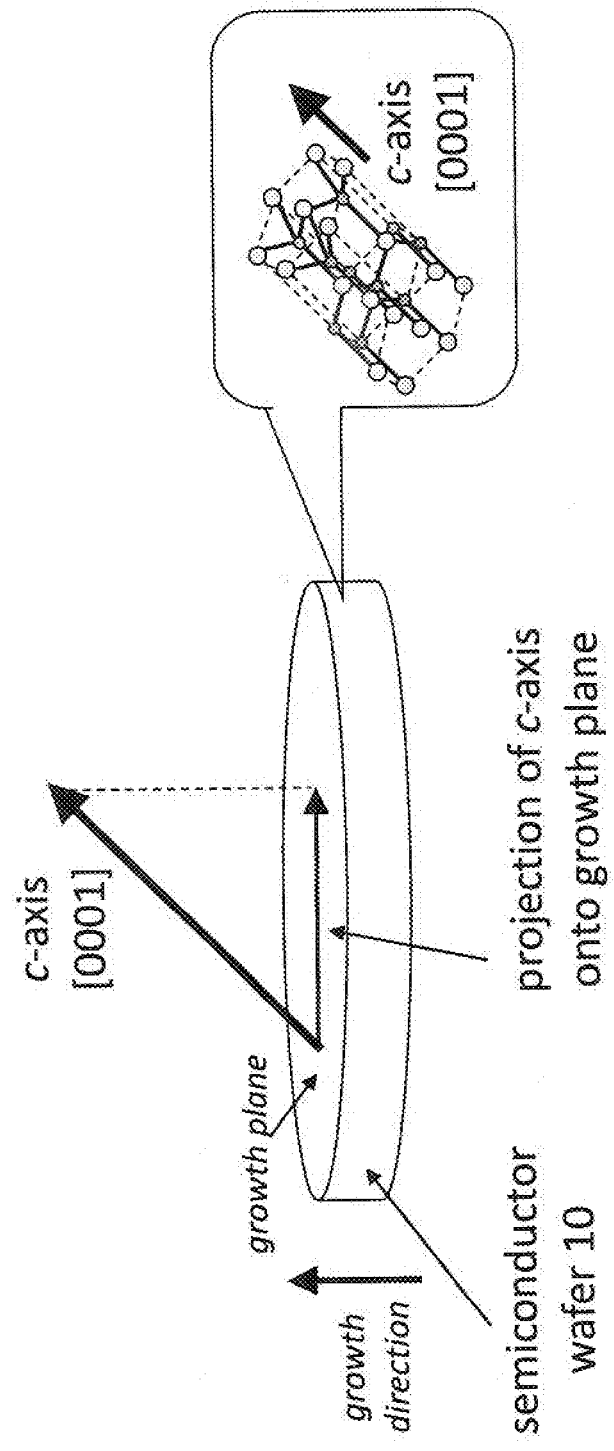
FIG. 9 illustrates the relative orientations of the crystal structure for a semi-polar wurtzite material relative to the growth plane. For the semi-polar structure utilized in conjunction with the present invention, the vector projection of the c-axis onto the growth plane is of a non-zero magnitude, as shown in FIG. 9.

By way of background, the terminology "polar" semiconductor is repeatedly referenced. A substance which has an unequal sharing of charge among constituent elements in the absence of a field is called a polar material. As used herein, the terminology polar, nonpolar, and semipolar relate to the orientations of the polar material. Specifically, FIGS. 8 and 9 are illustrations showing three different orientations (polar, nonpolar and semipolar) of the c-axis of a wurtzite crystal's structure (with c-axis being defined as perpendicular to the c-plane) relative to the growth plane, which in these examples is the sample surface. In the polar orientation example shown in FIG. 8, the c-axis is perpendicular to the growth plane. In the nonpolar orientation example, the c-axis is parallel to the growth plane and perpendicular to the growth direction. A semipolar orientation is depicted in FIG. 9 in which the c-axis of the crystal structure has a projection onto the growth plane. As used herein the terminology "projection onto" refers to a mathematical construct in which a vector diagram can be used to evaluate the intensity of the component projected onto a given plane. As shown in FIG. 9, the projection of the c-axis onto the growth plane results in a vector component labeled as "projection of c-axis onto growth plane" in FIG. 9. As seen in FIG. 9, the intensity value associated with the projection is non-zero; but may be in the range of from whatever angle that the crystal may be cut to 100%. The orientation of the crystal structure is that represented by the insert in FIG. 9

In a preferred embodiment of the present invention, a polar semiconductor is grown on a substrate such that growth proceeds in a non-polar direction, with the crystal's polar axis in-plane as depicted, for example in the bottom of FIG. 8. The fabrication process could involve creating a layer on the substrate and later etching away undesired portions or by selectively growing layer portions on the substrate. In accordance with the preferred embodiment illustrated in FIG. 3, the polar semiconductor could be in the configuration of bars or segments 20 supported by a substrate 10. Of significance is that the segments 20 have first and second air interface boundaries (or edges). Although these boundaries or edges appear linear in FIG. 3, they need only be of a form which results in the termination of the polarization at the boundaries or interfaces 21, 22 in a manner in which the polarization effects are achieved. For simplicity, the interfaces 21, 22 are labeled only for the rightmost segments 20 in each of FIGS. 3-7, but each segment (each of 20, 20A and/or 20B) has corresponding boundaries or interfaces 21, 22. The crystal structure of the segments 20 have a non-polar orientation and a non-zero in-plane polarization that can be terminated by a boundary, edge, or interface (21, 22) between the crystal and air (or another suitable material which causes the polarization to terminate at the boundary resulting in a charge at the boundary as a consequence of Gauss's Law). The boundaries/edges/interfaces 21, 22 (as depicted in FIGS. 3-7) normally occur substantially perpendicular to the polar axis, but this is not a requirement. As depicted for example in FIG. 18, the material forming the boundary (such as air) is essentially an interruption in the normal crystal planes, effectively resulting in a material of a smaller or larger bandgap (such as air) that terminates the polarization at the boundary creating a polarization charge which results in an electric field across the segment. In addition to non-polar oriented crystal structure configurations where there is a non-zero in-plane electric polarization, the principles of the invention may be utilized with structures in which there is a projection of the c-axis on the growth plane, which is referred to as semi-polar oriented material; a representation of which is shown in FIG. 9.

In a preferred embodiment, a polar semiconductor grown on a substrate has a non-zero in-plane polarization that can be terminated by etching away the semiconductor material to form a semiconductor-air interface which can be, for example, in the form of bars as shown in FIGS. 3-7. These bars can also be formed by selective growth of the bars on the substrate by, for example, masking certain areas to prevent growth in those areas. Assuming the segments or bars to be perpendicular to the in-plane projection of the polar axis, if this interface (21 or 22) occurs on an anion face, for example the gallium face of GaN, the interface will have a negative charge. If the interface (21 or 22) occurs on a cation face, for example the nitrogen face of GaN, it will have a positive charge. If one etches narrow bars of this material, these bars will therefore possess both positive and negative interfaces, leading to a strong internal electric field perpendicular to the bar axis. Moreover, if one etches a series of parallel bars, the internal electric fields in each bar will point in the same direction, as depicted in FIGS. 3-7. When the distance "d" (see arrows in FIG. 3) is very small, the electric field is determined by the piezoelectric and spontaneous polarizations in the material. However, as the bar width "d" becomes larger, for example, the field F across the bars decreases as $F\sim Eg/(qd)$, where Eg is the bandgap of the semiconductor and q is the electron charge. In otherwords, the dimension of the bar is restricted as the voltage across the bar cannot be greater than the bandgap in electron volts of the material; otherwise tunneling from the valence band to the conduction band would occur that would screen the polarization charge and reduce the field. For most practical bar widths (>100 nm) the internal field can be as large as 100 kV/cm in some materials without formation of metal contacts on the structure or application of a large external voltage. When illuminated with a ~100 fs pulse with photon energy greater than Eg, carrier transport in these bars will generate THz radiation. Since the field in each bar lies in the same direction, the contribution of each bar to the total THz signal should be additive. This preferred embodiment device therefore enables one to generate broadband THz pulses with higher pulse energy than a standard photoconductive switch because it can support higher electric fields, and allows one to do so without metallization or application of high external voltage, while avoiding dielectric breakdown in the air.

Optionally, enhancement of the electric field may be achieved by growing another polar semiconductor material with different lattice constant atop the polar semiconductor material described above with respect to FIGS. 5 & 7. The material of this additional layer may have a different lattice constant than the first semiconductor layer, and the thickness of this additional layer is limited by the critical thickness for strain relaxation. For example AlGaN on top of GaN, with the provision that the piezoelectric and spontaneous polarizations be additive. Although one additional layer has been described, more than one additional layer can be utilized without departing from the scope of the invention. Multiple layers could be desirable. When the bars are etched in this structure as described above, the built-in strain (as depicted by the symbol $\epsilon$) in the additional layer (or layers) will create a large internal piezoelectric field that adds to the polarization field in the added-on layer or layers.

The use of nonpolar growth directions to create in-plane spontaneous and piezoelectric polarizations that can be terminated at interfaces provided by etched bars to produce large in-plane internal electric fields in an array of contactless, photoconductive nanoswitches that create coherent additive THz fields under femtosecond pulse illumination is new and non-obvious. These novel structures allow one to replace the commonly used macro-photoconductive switches, which require metallization and application of large external voltages, to achieve THz emission when excited by femtosecond laser pulses.

Figure 5:
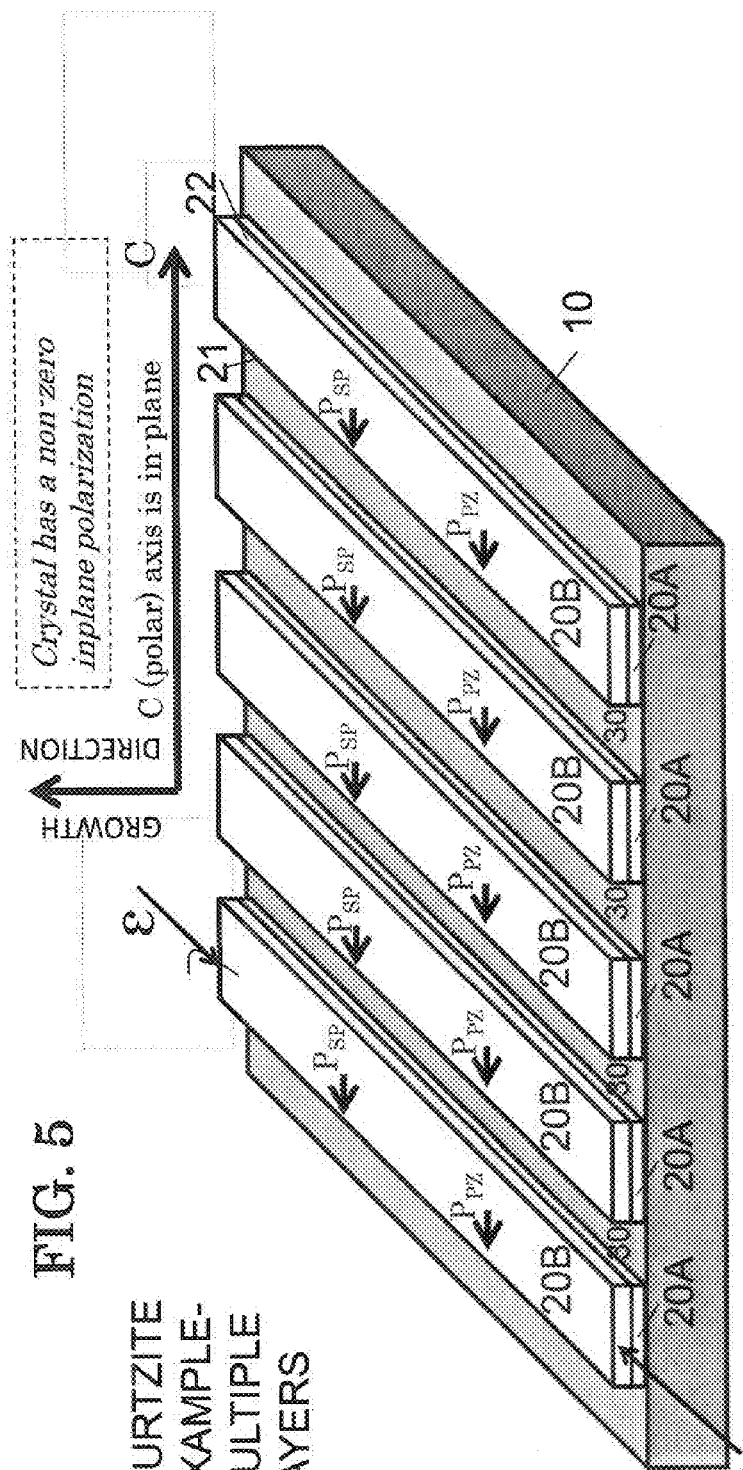
FIG. 5 is a schematic illustration of a preferred embodiment comprising a substrate 10 having formed thereon segments 20A, 20B of a polar crystal material having a wurtzite crystal structure wherein there is a lattice mismatch between the segments 20A of the polar crystal material and the substrate 10 and a lattice mismatch between the segments 20A and 20B, such that both piezoelectric and spontaneous polarizations are in the growth plane.

In the embodiments of FIGS. 3-5, the polar semiconductor could be wurtzite InN, GaN, AlN, or alloys thereof or ZnO, MgO, ZnS, ZnSe, ZnTe, or alloys thereof, with the nonpolar a-plane or m-plane as the growth plane. Semi polar wurtzite InN, GaN, AlN, or alloys thereof or ZnO, MgO, ZnS, ZnSe, ZnTe, or alloys thereof, with a projection of the c-axis (polar axis) in the growth plane can also be used. In FIG. 5, strained wurtzite InN, GaN, AlN, or alloys thereof, or ZnO, MgO, ZnS, ZnSe, ZnTe, or alloys thereof with a different lattice constant than the first wurtzite layer of InN, GaN, AlN, or alloy thereof, or ZnO, MgO, ZnS, ZnSe, ZnTe, or alloys thereof can be grown atop the first layer to create an additional piezoelectric field.

Figure 6:
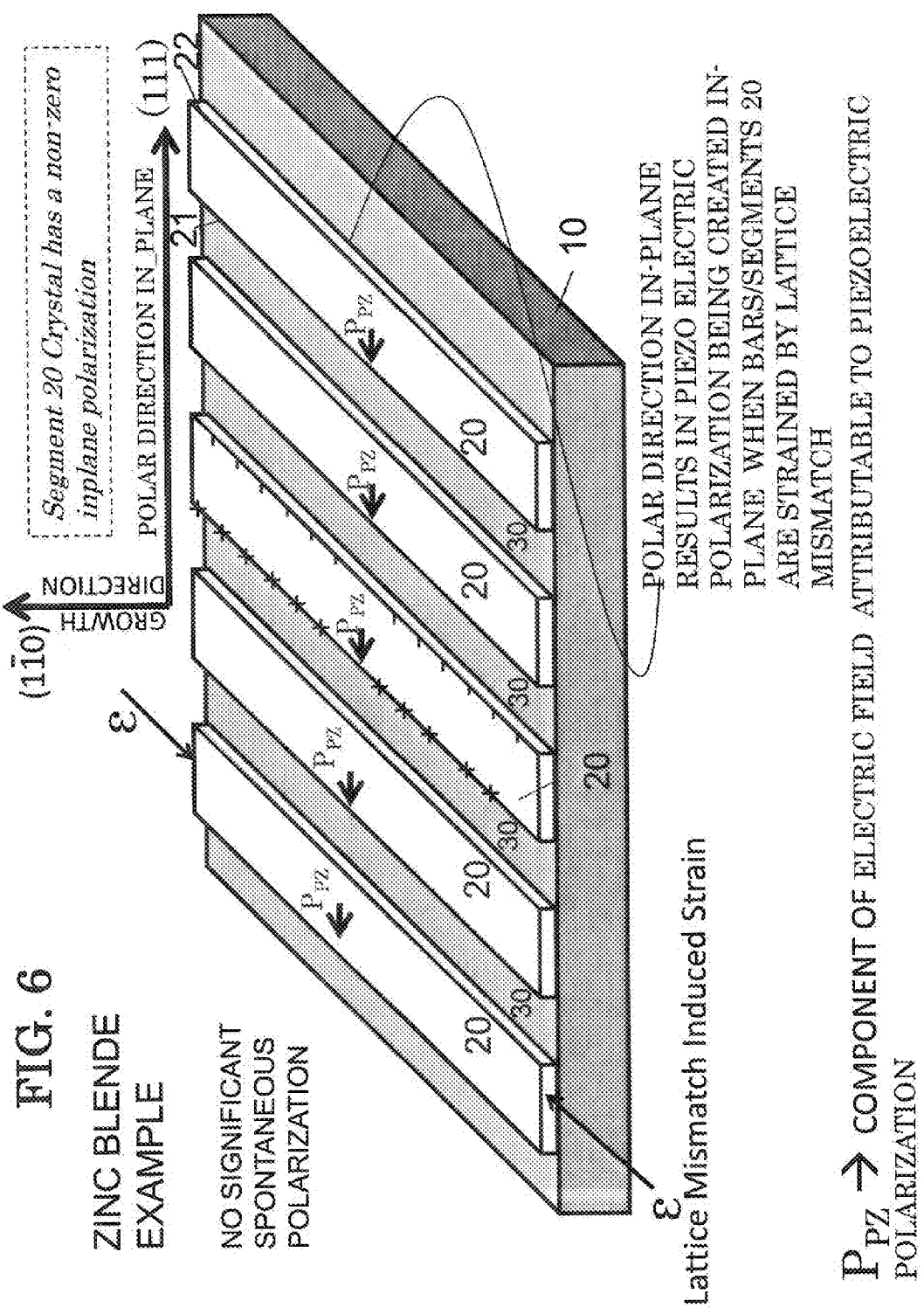
FIG. 6 is a schematic illustration of a preferred embodiment comprising a substrate 10 having formed thereon segments 20 of a polar crystal material having a zinc blende crystal structure wherein there is a lattice mismatch between the segments 20 of the zinc blende polar crystal material and the substrate 10 such that both piezoelectric and spontaneous polarizations are in the growth plane.
Figure 7:
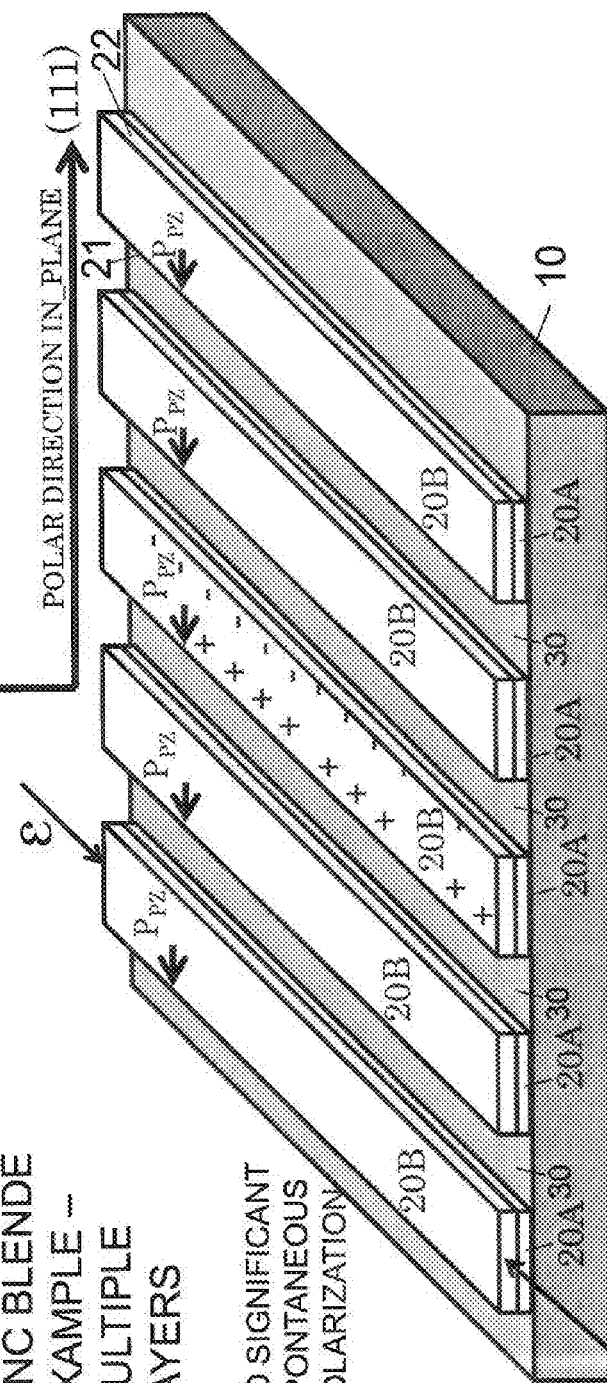
FIG. 7 is a schematic illustration of a preferred embodiment comprising a substrate 10 having formed thereon segments 20A, 20B of a polar crystal material having a zinc blende crystal structure wherein there is a lattice mismatch between the segments 20A of the polar crystal material and the substrate 10 and a lattice mismatch between the segments 20A and 20B, such that both piezoelectric and spontaneous polarizations are in the growth plane.

As depicted in FIGS. 6-7, the polar semiconductor could also be zincblende GaAs, InAs, AlAs, InN, GaN, AlN, GaSb, AlSb, InSb or alloys thereof, with the nonpolar growth axis as the <110> direction, and, as depicted in FIG. 7, a strained layer of GaAs, InAs, AlAs, InN, GaN, AN, GaSb, AlSb, InSb or alloy thereof with a different lattice constant than the first layer grown atop this layer to create a piezoelectric field in the <111> direction when the polarization is terminated as etched bars. The polar direction in plane results in piezoelectric polarization being created in plane when bars are strained due to the lattice mismatch induced strain $\epsilon$ depicted by the arrows in FIGS. 6 and 7. The piezoelectric polarization $P_{PZ}$ is created as depicted by the representation of the bar in FIGS. 16-17. Although rectangular bars are shown in FIGS. 3-7 and FIGS. 15-17, the invention is not limited to rectangular bars. Instead of rectangular, the configuration could be polygons, or any coplanar segment connected end-to-end to form a closed shape. In addition, the invention could be used with any curved closed shape; as long as there is a net polarization; where polarization is defined as a vector (i.e. the net polarization can be defined as pointing in a given direction). Because of the polarization fields, the photo excited carriers are accelerated and produce terahertz radiation (when illuminated by the laser).

The electric field is created by the polarization being terminated by creation of the material/air interface, which occurs (in the case of FIGS. 3-7) at the edge/boundary/interface between the bars and the air, for example. Unlike the photoconductive switches, there is no voltage requirement as the electric field is built into (or created from) the structure.

The semiconductor material forming the segments 20 in FIGS. 3-7 can be patterned using electron beam lithography for bars with widths as small as 100 nm. Standard dry and wet etching techniques can be used to create the segments 20. The most preferable excitation source is a low cost, compact, femtosecond fiber laser operating at either 1030 nm or 1560 nm (fundamental), or 515 nm or 780 nm (second harmonic).

The interfaces 21, 22 at the boundary of the segment or bar that results in the termination of the polarization may be other than air (or a vacuum). Although air or a vacuum is preferred, the interface creating material can be another material that is not a conducting material. This can be achieved after etching, such as by regrowth of a non-conducting material. For example after growing the bars, a non-conducting material may be grown or deposited between the bars or segments 20.

It is possible that if the nonconducting material is also a polar material, and the polarization is stronger that the segment or bar material, then the added nonconducting polar material can also be used to generate terahertz emission.

The segments 20 can also be created spontaneously. One example is using stacking faults resulting from combining wurtzite and zinc blende material (which correlates to the additional material mentioned above), as described in detail in U.S. application Ser. No. 12/435,797 entitled "Method and Apparatus for Enhanced Terahertz Radiation from High Stacking Fault Density."

Although five segments 20, 20A and/or 20B are shown in FIGS. 3-7, it is desirable to have as many bars as possible. For example the segments 20, 20A and/or 20B could number from one hundred to several thousand if a large amount of power is desired. As mentioned earlier, when the distance "d" is very small (as shown in FIG. 3), the electric field is determined by the piezoelectric and spontaneous polarizations in the material. However, as the bar width "d" becomes larger, for example, the field F across the bars decreases as $F \sim Eg/(qd)$, where Eg is the bandgap of the semiconductor and q is the electron charge. Therefore making the width of the bar or segment smaller is desirable.

Various Wurtzite or Hexagonal compounds can be utilized to form the crystal structure for segments 20, 20A and/or 20B, such as, for example, GaN, InN, AlN and alloys thereof, ZnO, MgO, ZnS, ZnSe, ZnTe, and alloys thereof, and SiC. These materials can be used as represented by FIGS. 3-5. Zinc Blende compounds can be used, as represented by the embodiments of FIGS. 6 and 7. The Zinc Blende compounds which could be utilized include zincblende GaAs, InAs, AlAs, GaN, InN, AlN, GaSb, AlSb, InSb or alloys thereof, ZnO, MgO, ZnS, ZnSe, ZnTe, and alloys thereof, and SiC. Various crystal structure methods of formation may be used to create the crystal structure, including molecular beam epitaxy (MBE) and metal organic chemical vapor deposition (MOCVD), which are known to those of ordinary skill in the art. As illustrated in FIG. 2A, for the greatest enhancement in THz radiation, the c-axis is in the plane of incidence and pointed along the +y direction (the x-y plane is shown in the left corner of FIGS. 2A, 2B), and detection of the THz radiation is in the p-wave direction.

Figure 10:
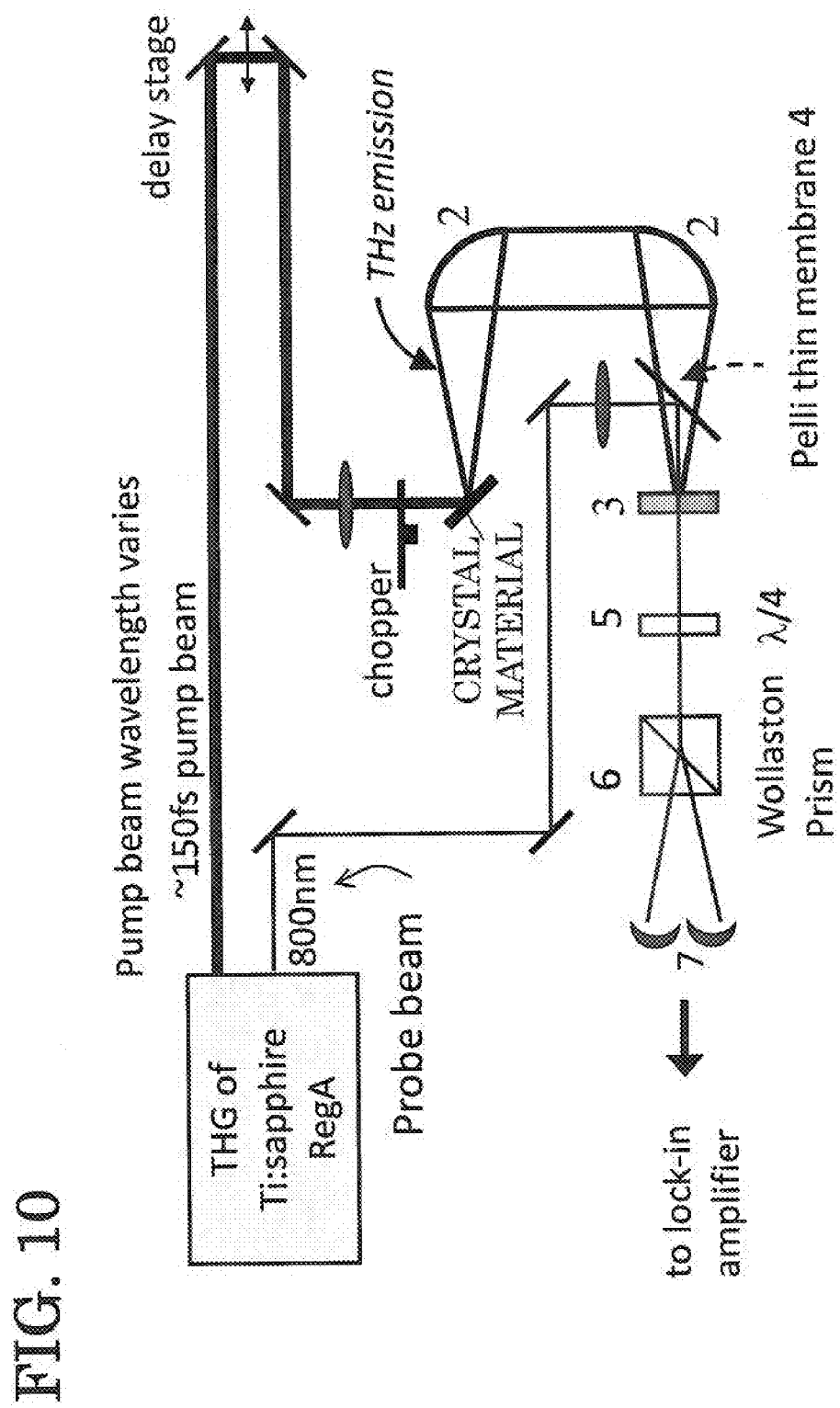
FIG. 10 is a schematic illustration of a preferred embodiment for producing and measuring terahertz emission from a crystal material.

FIG. 10 is a schematic illustration showing a crystal material in which the subsequent THz emission is collected with a pair of parabolic mirrors (2) on to a sensor 3 (which may, for example, be an electro-optic crystal such as a ZnTe crystal) for electro-optic sampling, using part of the 800 nm beam as the probe. The terahertz detection may also be done using a photoconductive switch. In the configuration shown in FIG. 10, the polarization of the pump and probe beams are both in the plane of incidence. Although the material Galium Nitride is used for the example in FIG. 10, other materials can be used, as for example, the polar semiconductor could be wurtzite InN, GaN, AlN, or alloys thereof, or ZnO, MgO, ZnS, ZnSe, ZnTe, or alloys thereof, or SiC, with the nonpolar a-plane or m-plane as the growth plane. Semi polar wurtzite InN, GaN, AlN, or alloys thereof, or ZnO, MgO, ZnS, ZnSe, ZnTe, or alloys thereof, or SiC, with a projection of the c-axis (polar axis) in the growth plane can also be used. Strained wurtzite InN, GaN, AlN, or alloys thereof, or ZnO, MgO, ZnS, ZnSe, ZnTe, or alloys thereof, or SiC,with a different lattice constant than the first wurtzite layer of InN, GaN, AlN, or alloy thereof, or ZnO, MgO, ZnS, ZnSe, ZnTe, or alloys thereof, or SiC, can be grown atop the first layer to create an additional piezoelectric field.

The polar semiconductor could also be zincblende GaAs, InAs, AlAs, GaN, InN, AlN, GaSb, AlSb, InSb or alloys thereof, ZnO, MgO, ZnS, ZnSe, ZnTe, and alloys thereof, or SiC, with the nonpolar growth axis as the <110> direction, and a strained layer of GaAs, InAs, AlAs, GaN, InN, AlN, GaSb, AlSb, InSb or alloys thereof, ZnO, MgO, ZnS, ZnSe, ZnTe, and alloys thereof, or SiC or alloy thereof with a different lattice constant than the first layer grown atop this layer to create a piezoelectric field in the <111> direction when the polarization is terminated as etched bars.

Although the pump beam is shown in FIG. 10 as being at a wavelength of 266 nm, suitable for pumping the Galium Nitride example, it is only necessary that the wavelength of the pump beam correspond to a photon energy larger than the bandgap of the material being excited.

The plane of incidence is best understood by reference to FIG. 2A as the plane containing the laser propagated (incident) and THz propagated directional arrows. An exemplary configuration is shown in FIG. 10 that enables measurements via ultrafast optical excitation. In an additional example, a regenerative amplifier (RegA) system, which operates at 800 nm and has a repetition rate of 250 kHz, may be used as the ultrafast laser source L. The output of the RegA is split into two beams. For infrared excitation pulses, the stronger beam is frequency doubled to serve as the pump source for an optical parametric amplifier (OPA), which generates an infrared idler pulse tunable from ~0.9-2.4 micrometers. The OPA also produces a visible signal beam tunable from ~480-720 nm. The signal beam at 700 nm is doubled for 350 nm excitation. For other ultraviolet pulses, the stronger RegA beam is frequency doubled (400 nm) or tripled (266 nm). The pump pulse, after compression with a prism pair to typical pulse widths of ~150 fs, is focused onto the semiconductor sample at a 45° incidence angle with a beam diameter of ~1 mm. The pump power is ~4 mW for all excitation wavelengths. The weaker RegA split-off beam is used to probe the THz emission for all excitation wavelengths, as well as to irradiate the samples at 800 nm. The subsequent THz emission from the semiconductor surface is collected and focused with a pair of off-axis parabolic mirrors (2) onto a 2 mm-thick ZnTe crystal (3) for electro-optic (EO) sampling, which is based on the linear EO effect or Pockels effect and allows for coherent detection of freely propagating THz emission. The THz radiation incident on the EO crystal alters the birefringence of the crystal which results in a phase retardation of the probe beam through the EO crystal. Monitoring of the phase retardation of the probe beam is conducted with a balanced detector system.

The detection is a known electro optic sampling technique for detecting Terahertz emission. The configurations shown in FIGS. 10, 11, 12, and 13 use both a probe beam and a pump beam. Specifically, a reflector 4, which may be for example, a pellicle or thin membrane, reflects the probe beam and transmits terahertz radiation. The quarter wave plate 5 results in the linearly polarized incident probe beam becoming circularly polarized. The circularly polarized probe beam is then split by the Wollaston prism 6 which breaks up the vertically and horizontally polarized components of the probe beam spatially. The difference signal between the vertically and horizontally polarized components is detected using a balanced detector. When no terahertz emission is present, the balanced detector measures no signal. When terahertz emission is produced, the circularly polarized probe beam becomes elliptically polarized. For an elliptically polarized probe beam, one polarization component has a stronger amplitude and the balanced detector 7, indicates the difference between each; i.e., the Wollaston Prism effectively breaks the beam into two orthogonal polarizations, and because the elliptically polarized probe light has two unequal components due to the Terahertz emission, the subtraction results in measurement of the Terahertz emission. For a more comprehensive explanation, reference is made to A. Nahata, et al., "Coherent Detection of Freely Propagating Terahertz Radiation by Electro-optic Sampling," Appl. Phys. Lett. 68 (2), 8 Jan. 1996, which is hereby incorporated by reference. Although all III-Nitride semiconductors can emit THz radiation, a preferred embodiment utilizes InN, which has applications in 1550 nm fiber-laser based systems.

Figure 11:
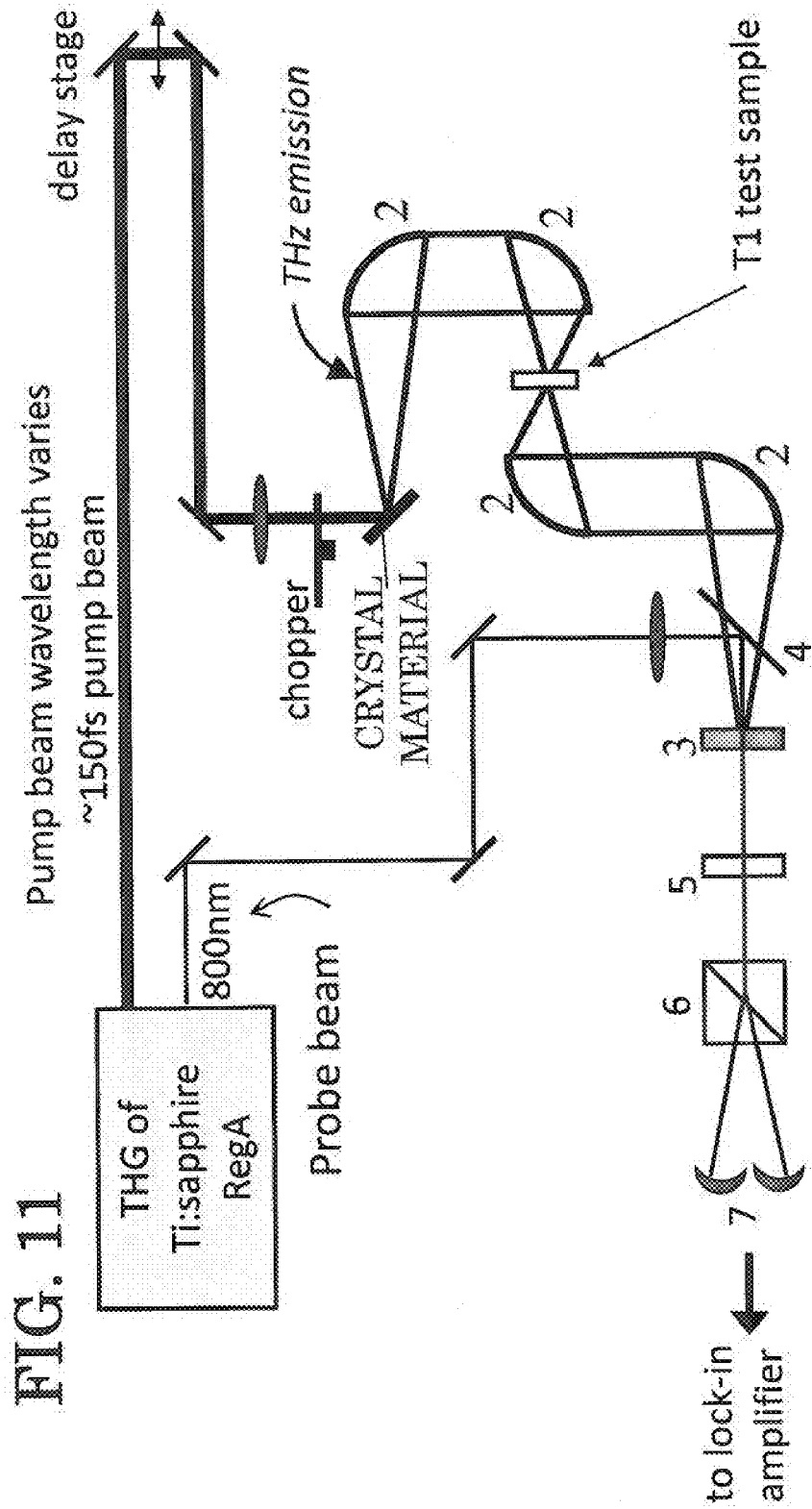
FIG. 11 is a schematic illustration of a preferred embodiment for producing and measuring terahertz emission from a crystal material wherein detection is accomplished from measuring terahertz transmission transmitted through the test sample.
Figure 12:
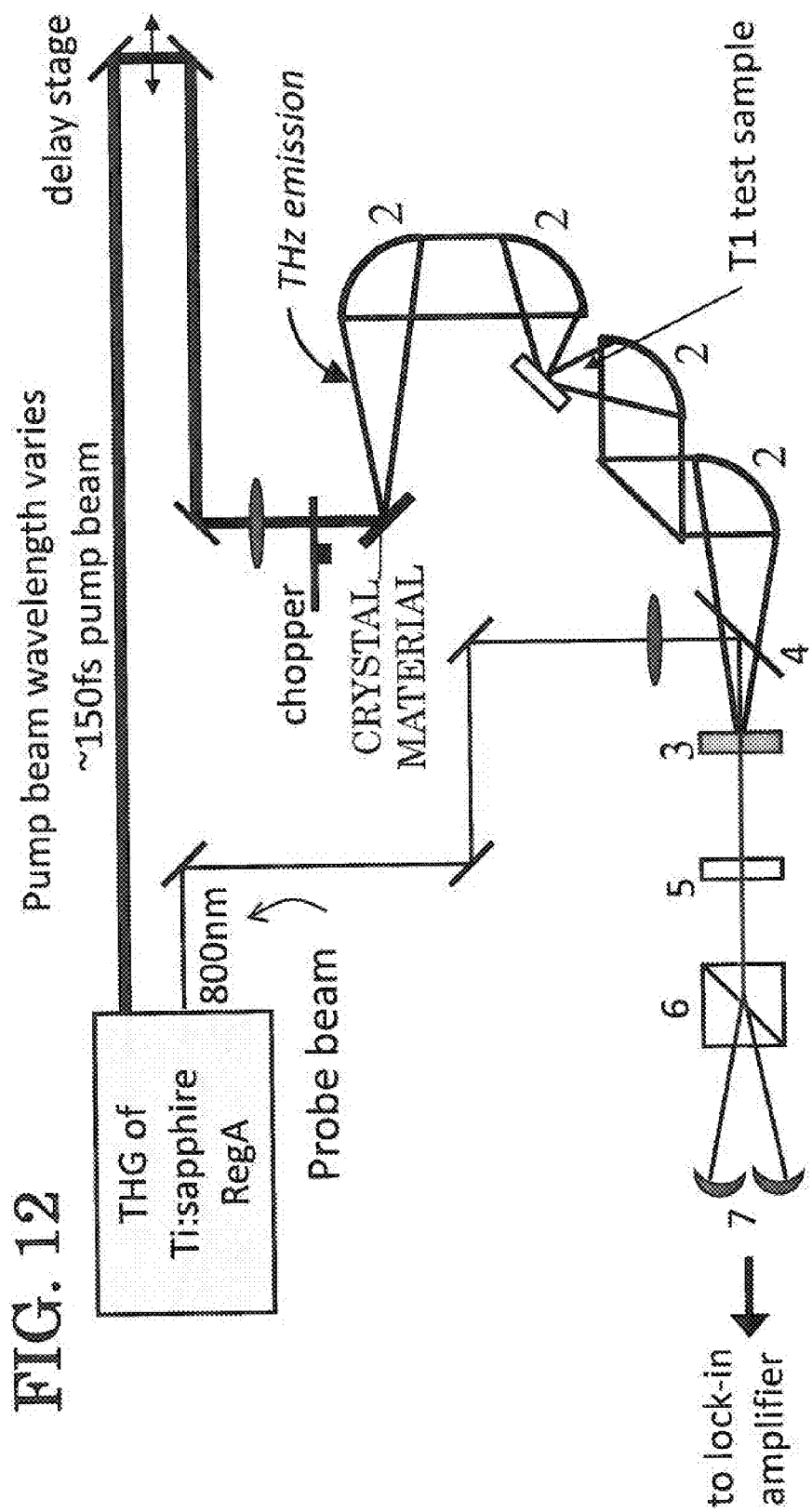
FIG. 12 is a schematic illustration of a preferred embodiment for producing and measuring terahertz emission from a crystal material reflected from a test sample.

FIG. 11 is a configuration in which a test sample T1 is subjected to Terahertz radiation and the configuration measures transmission of THz through a test sample. The test sample T1 can be in a gas, liquid or solid phase. In FIGS. 11 and 12, elements corresponding to those in FIG. 10 are numbered with corresponding numbers. THz emission is collected with four parabolic mirrors 2 onto an electro-optic crystal 3 (which may for example be a ZnTe crystal) for electro-optic sampling, using part of the 800 nm beam as the probe. The pellicle or thin membrane 4 reflects the probe beam while allowing the terahertz radiation to pass through. The polarization of the pump and probe beams are both in the plane of incidence. The plane of incidence is best understood by reference to FIGS. 2A and/or 2B as the plane containing the laser propagated (incident) and THz propagated directional arrows. The quarter wave plate 5 is an optical device that alters the polarization state of a light wave travelling through it by shifting the phase between two perpendicular polarization components of the light wave. The quarter-wave plate 5 creates a quarter-wavelength phase shift that changes linearly polarized light to circular. When the Terahertz radiation is absent, the circularly polarized light from the probe beam has two substantially identical intensity components which are separated by the Wollaston prism into two orthogonal, linearly polarized outgoing beams. Two photodetectors measure the two outgoing beams from the Wollaston prism and output the difference. When terahertz radiation is present, the probe beam becomes elliptically polarized and results in a difference being detected by detectors 7.

FIG. 12 is a configuration which measures reflection of THz from a test sample T1. The test sample T1 can be in a gas, liquid or solid phase. The configurations described with respect to FIGS. 10-13 are merely exemplary and the scope of the invention is not limited to these particular embodiments.

Figure 13:
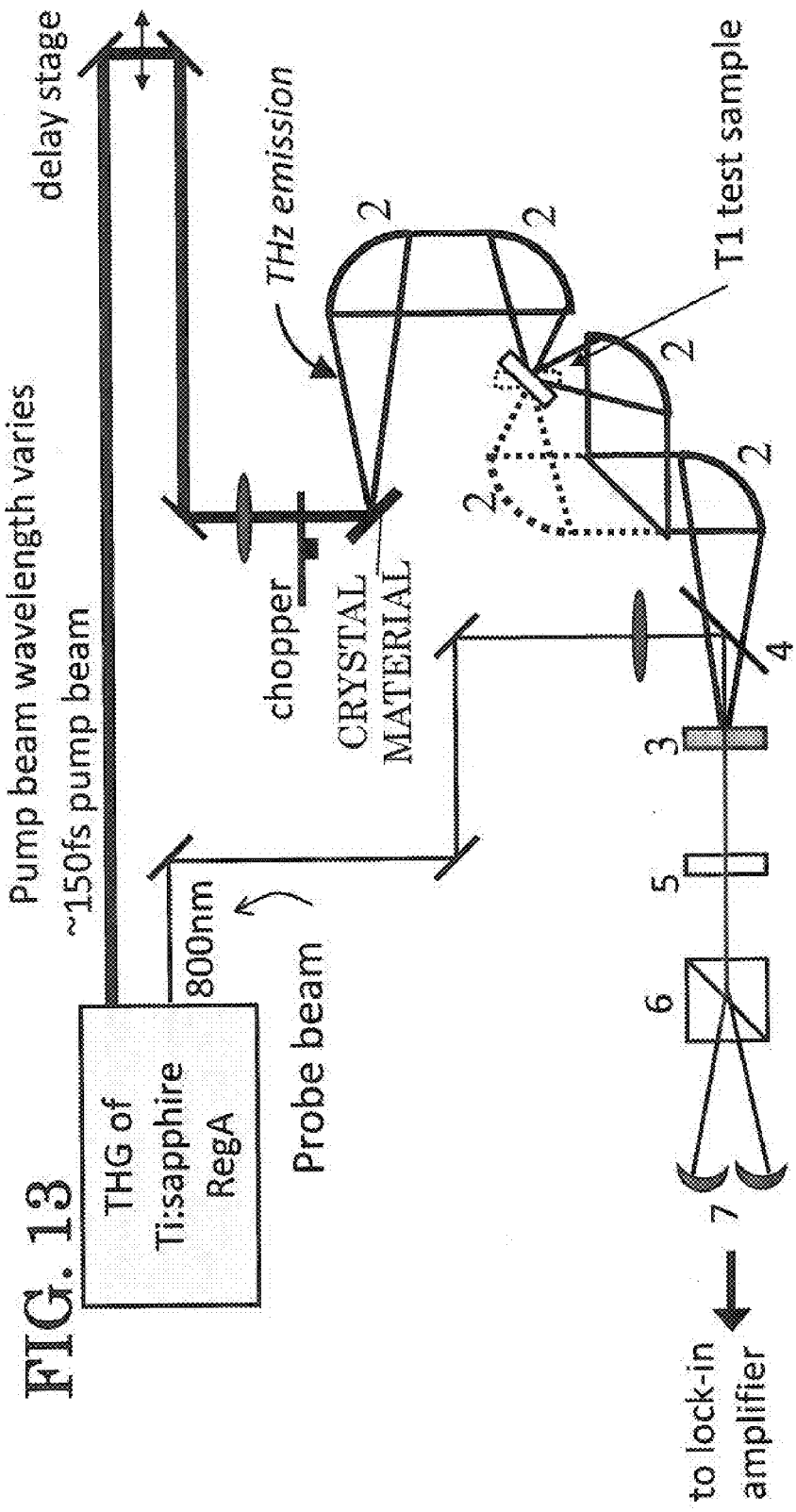
FIG. 13 is a schematic illustration of a preferred embodiment for producing and measuring terahertz emission from a crystal material both reflected from and transmitted through a test sample.

Moreover, the components of FIGS. 10-13 are illustrated as separated elements; however, one of ordinary skill in the art would appreciate that in practice the components of FIGS. 10-13, with the exception of the test sample T1, would be assembled together to form an integral assembly. Each of the FIGS. 10-13 could form a separate embodiment. Alternatively, the components could be arranged to permit modification to accommodate the entry and analysis of the test samples T1. For example, a single assembly may be a composite of FIGS. 11 and 12 and, depending upon whether the test sample T1 will reflect or transmit terahertz radiation, the parabolic mirrors 2 and receiving elements 3, 4, 5, 6 and 7 of FIGS. 11 and 12 could be adjusted or relocated to accommodate the transmitted or reflected THz radiation. For example, the elements 3, 4, 5, 6 and 7 could be integrally mounted and the mirrors 2 could be adjustable to accommodate either transmitted or reflected terahertz radiation. Alternatively, two separate paths could be achieved by superimposing the two images of FIGS. 11 and 12 to create an apparatus as shown in FIG. 13.

FIG. 14 is an illustration of the wurtzite structure observed in, inter alfa, III-V nitride semiconductors, characterized by a highly polar material that can support a significant spontaneous polarization along the c or [0001] axis. Internal polarization is further enhanced in strained nitrides due to the piezoelectric effect. Terahertz emission using the principles of the present invention is dependent in part upon the orientation of the crystal lattice structure within the various samples TS, which in turn is defined relative to the c-plane or c-axis, a-plane and m-plane, all of which are represented in FIG. 14. For c-plane or (0001)-oriented wurtzite the growth is along the c-axis; and the c-axis is perpendicular to the growth plane. Non-(0001) orientated wurtzite occurs when the growth is not along the c-axis and the c-axis is not perpendicular to the growth plane; such as for example, m-plane ($1\bar{1}00$) wurtzite orientation.

FIG. 15 is an illustration of a segment or bar wherein there is an internal electric field in nonpolar (c-axis is parallel to growth plane) wurtzite GaN. As shown in FIG. 15, spontaneous polarization is terminated at the boundaries/interfaces 21, 22, resulting in positive and negative charge accumulation at the interfaces 21, 22, respectively. In application Ser. No. 12/435,797 (see FIGS. 7-9 therein), the special case was described in which the discontinuity in the GaN wurtzite structure (AB or BC) results in a stacking fault characterized by a GaN zinc blende structure or domain (ABC). As described in more detail in Ser. No. 12/435,797, stacking faults may be intentionally created during the formation of the crystal; primarily from the large density of structural defects associated with heteroepitaxial growth on lattice-mismatched substrates.

FIG. 16 is a schematic illustration showing an enlarged view of one segment 20, 20A or 20B of FIGS. 4 and 5 and the spontaneous and piezoelectric polarization existing thereon. The buildup of charge at the boundaries 21, 22 (or air interfaces) establishes an electric field in the [0001] direction, and carriers excited by a femtosecond optical pulse drift in the internal electric field.

FIG. 17 is a schematic illustration showing an enlarged view of one segment 20, 20A or 20B of FIGS. 6 and 7 and the piezoelectric polarization existing thereon. In the case of zinc blende, the spontaneous polarization is relatively insignificant. The buildup of charge at the boundaries (or air interfaces) 21, 22 establishes an electric field in the <111> direction as carriers excited by a femtosecond optical pulse drift in the internal electric field.

FIG. 18 is a schematic depiction of the band energy diagram of the wurtzite structure and the discontinuances in the wurtzite structure caused by air interface.

FIG. 19 is a depiction of quantum well configurations shown in relationship to the segments 20 shown in FIG. 18. As illustrated in FIG. 10, internal electric fields are created due to the termination of the internal polarization at the interfaces between materials, such as between InGaN and InN.

Figure 20:
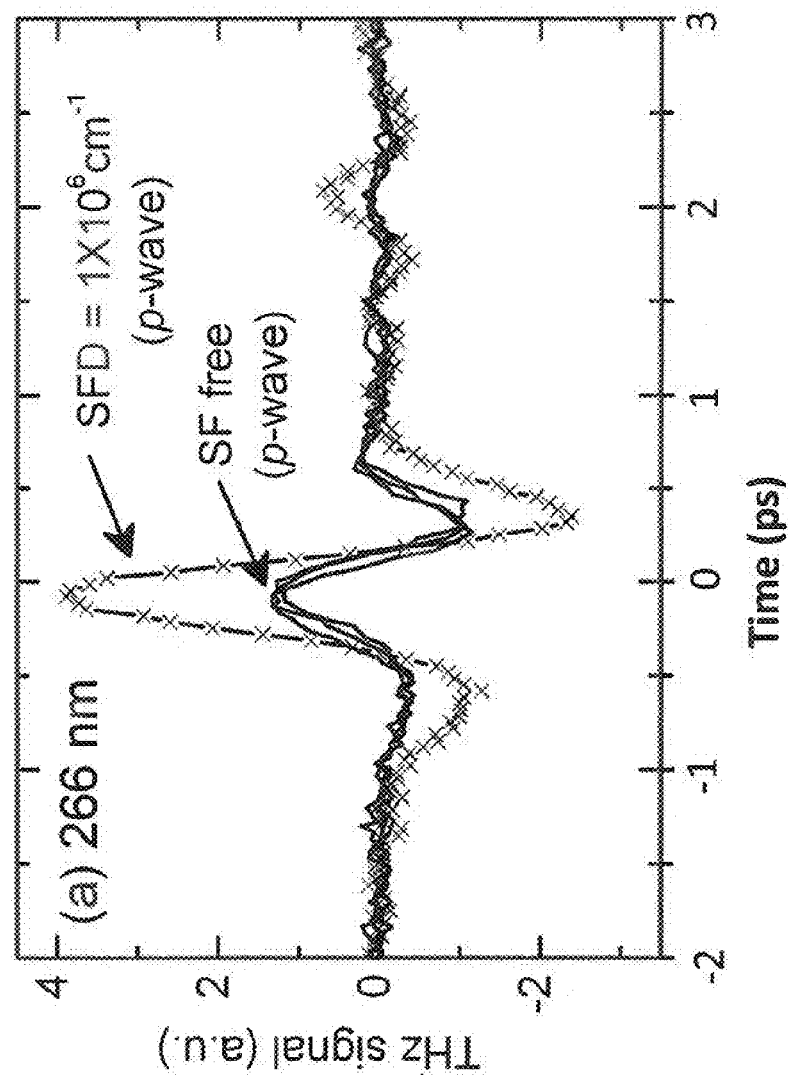
FIG. 20 is a graphical illustration of time-resolved p-wave terahertz signal amplitude showing enhanced terahertz emission from a high stacking fault density (SFD) m-plane GaN sample relative to a SF-free m-plane GaN sample.
Figure 21:
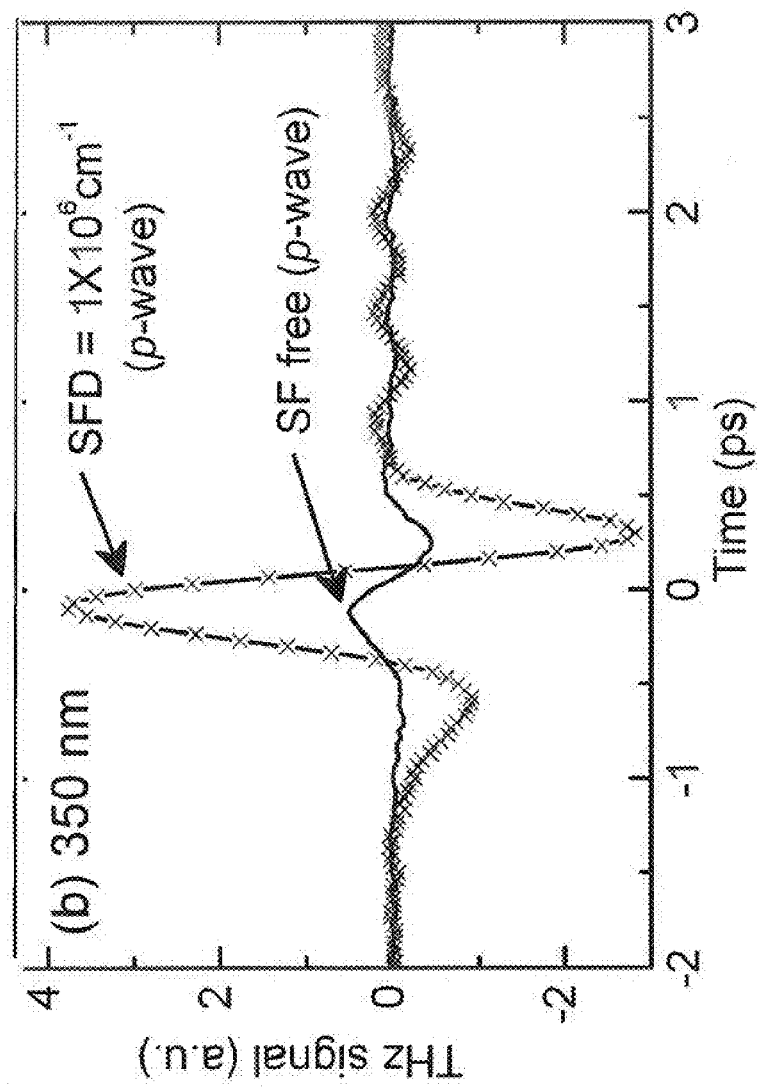
FIG. 21 is a graphical illustration of time-resolved p-wave terahertz signal amplitude showing enhanced terahertz emission from a high stacking fault density (SFD) m-plane GaN sample relative to a SF-free m-plane GaN sample, especially for longer excitation wavelength.

Data has been taken from application Ser. No. 12/435,797 with respect to FIGS. 20 and 21, which are graphical illustrations of enhanced Terahertz emission from a "stacking fault" sample relative to a stacking fault-free sample, especially for longer excitation wavelengths, due to in-plane E-field from Stacking Fault (SF) terminated internal polarization. The "stacking fault" case described in detail in application Ser. No. 12/435,797 is an example embodying the conceptual basis of the present invention in which the stacking faults are used to create the discontinuity of the polar material; i.e.; stacking faults are substituted for the interfaces 21, 22 shown in FIGS. 3-7. FIGS. 20 and 21 show time-resolved p-polarized THz signal from stacking fault free m-plane GaN and the high-stacking-fault-density m-plane GaN (m-plane ($1\bar{1}00$)) epilayer with a SF density of $1 \times 10^6$ cm$^{-1}$) at a sample rotation angle of 180°, under (FIG. 20) 266 nm and (FIG. 21) 350 nm excitation. Illustrated in FIG. 20 is Terahertz emission from the SF-free m-plane GaN sample at sample rotation angles ranging from 0 degrees to 360 degrees.

The THz emission from the m-plane GaN material was compared with that from an approximately 330 μm-thick SF-free m-plane GaN substrate. The samples were optically excited using the third harmonic (266 nm) of a Coherent regenerative amplifier (RegA) at 800 nm with a repetition rate of 250 kHz and typical pulse width of approximately 150 fs. The pump beam was incident on the GaN sample at 45 degrees to the surface normal. The subsequent THz emission was collected with a pair of parabolic mirrors onto a ZnTe crystal for electro-optic sampling (as schematically illustrated in FIG. 10). The ZnTe-based THz electro-optic detection system is polarization sensitive, enabling analysis of the polarization of the THz radiation.

Figure 22:
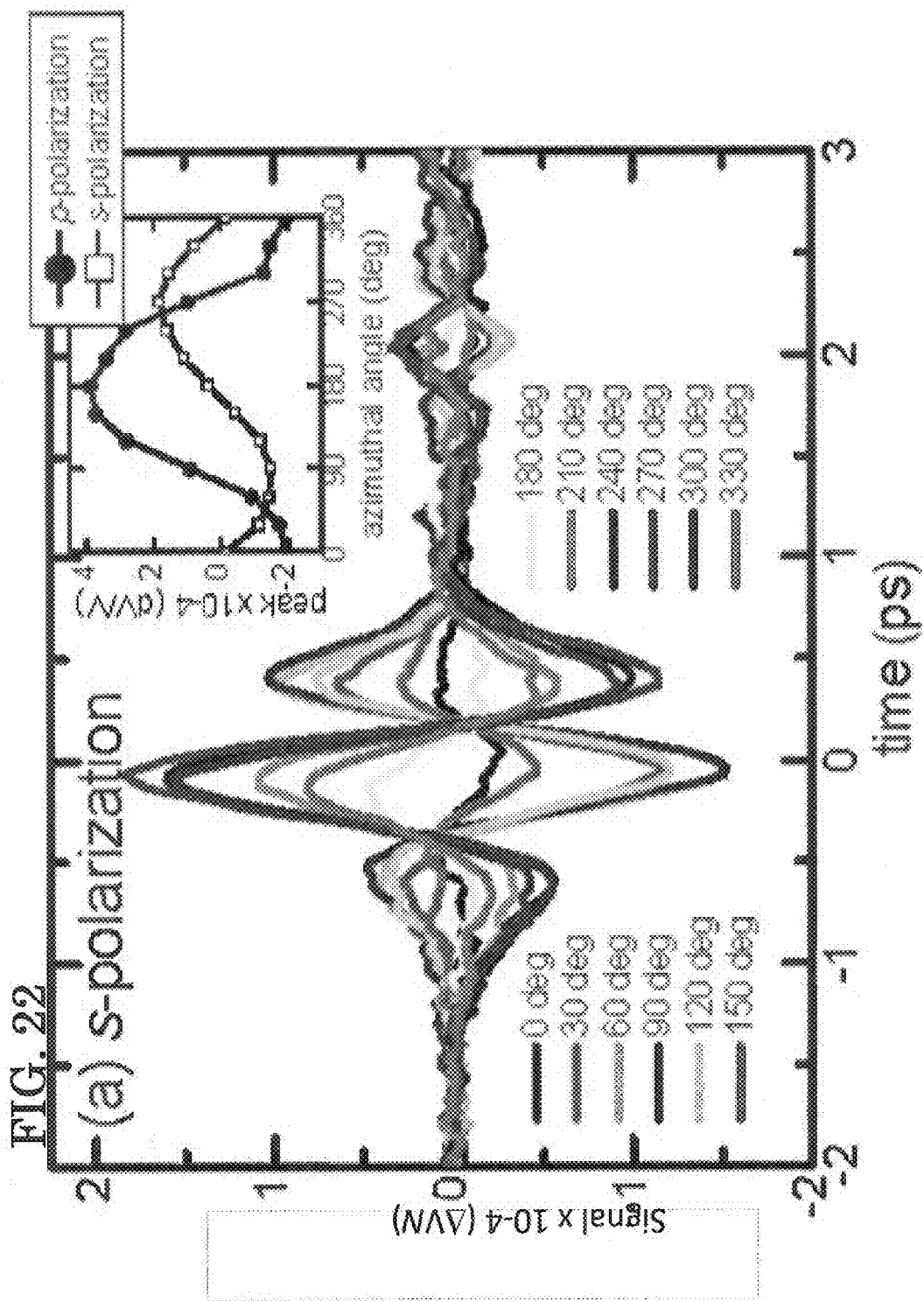
FIG. 22 graphically illustrates time-resolved s-wave terahertz signal from a m-plane GaN sample at various sample rotation angles. The insert in FIG. 22 shows the sinusoidal dependence of the peak terahertz signal from the SF sample on sample azimuthal angle, consistent with terahertz emission due to in-plane electric fields. Note the 90 degree shift between the p-polarization and s-polarization curves. The m-plane GaN sample has a stacking fault density of $10^6$ cm$^{-1}$ and is excited with femtosecond laser pulses at 266 nm.
Figure 23:
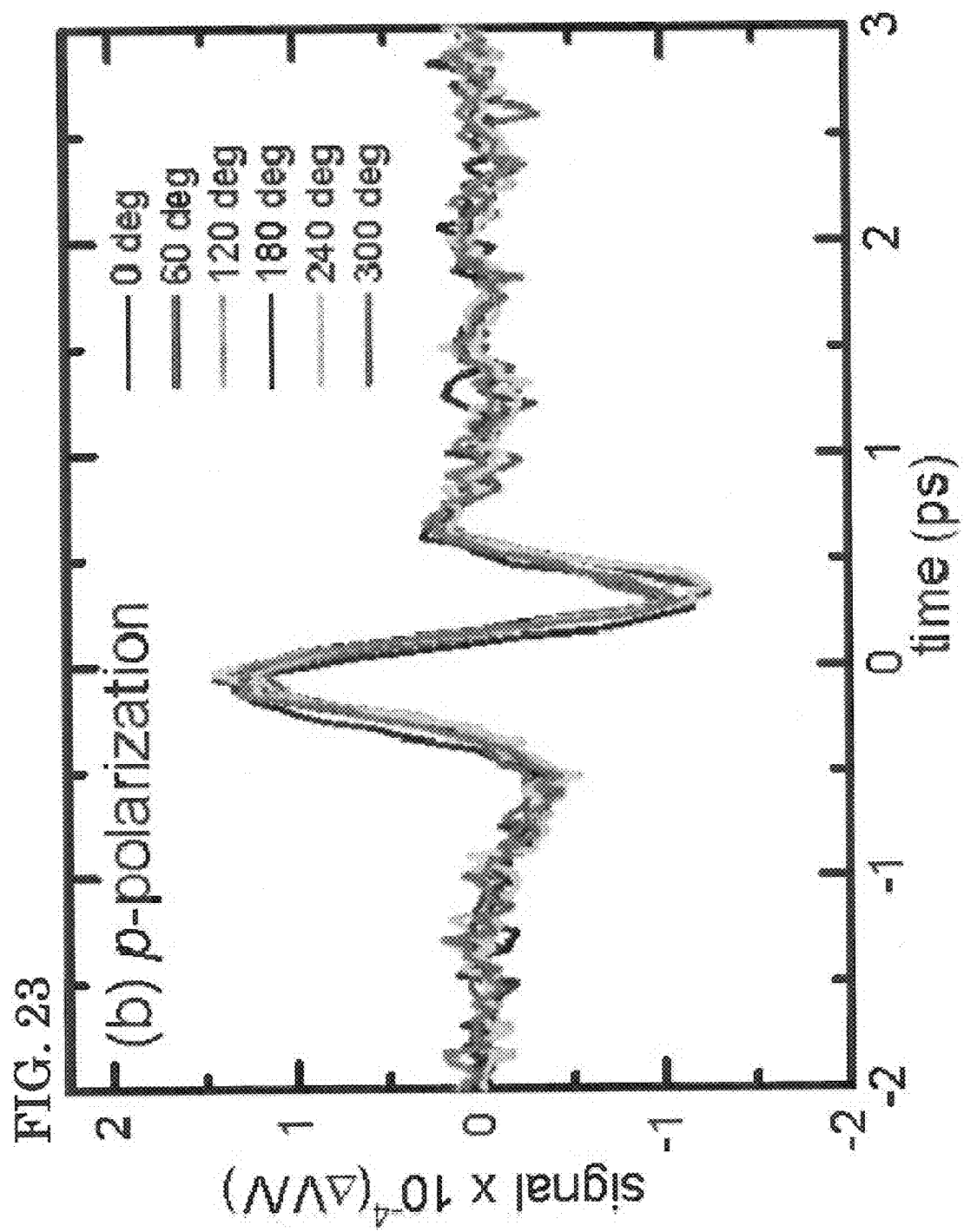
FIG. 23 is a graphical illustration of p-wave terahertz signal amplitude from a SF-free m-plane GaN sample at sample rotation angles ranging from 0 degrees to 360 degrees. The sample is optically excited by femtosecond laser pulses at 266 nm. For the SF-free sample, there is no sample rotation dependence of the terahertz emission and no s-wave terahertz radiation is detected. The signal from the SF-free sample is due to surface normal photocurrents.
Figure 24:
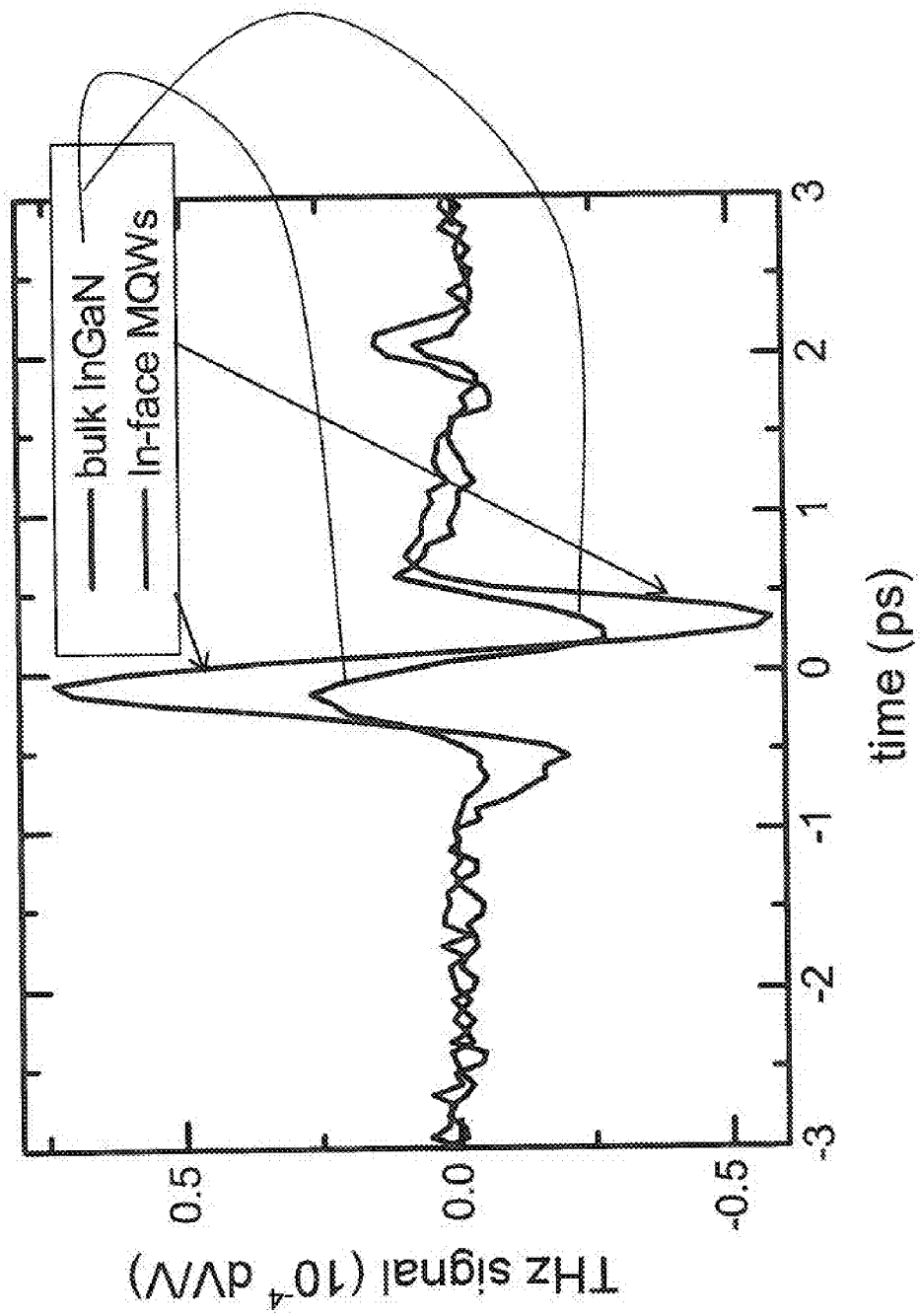
FIG. 24 is a graphical illustration depicting time resolved terahertz signal intensity.

FIG. 22 illustrates a time-resolved s-polarized THz signal from the high stacking fault-density m-plane GaN epilayer at different sample or azimuthal rotation angles Ø of the sample. The terms p-and s-polarization (or p-and s-wave) refer to the polarization of the THz signal which is parallel and perpendicular to the plane of incidence, respectively. At Ø=0 degrees, the c-axis was in the plane of incidence. As the sample was rotated, the measured s-polarized THz signal polarity flips, reaching its negative extremum value at Ø=90 degrees and its positive extremum value at Ø=270 degrees. The inset in FIG. 22 displays the sinusoidal dependence of the peak p-and s-polarized THz signal from the high SF density m-plane GaN substrate. FIG. 23 shows the THz signal from the SF-free m-plane GaN at sample rotation angles ranging from 0 degrees to 360 degrees which exhibits virtually no dependence on sample rotation. No s-wave component is observed from the stacking fault-free m-plane GaN material illustrated in FIG. 23.

Figure 29:
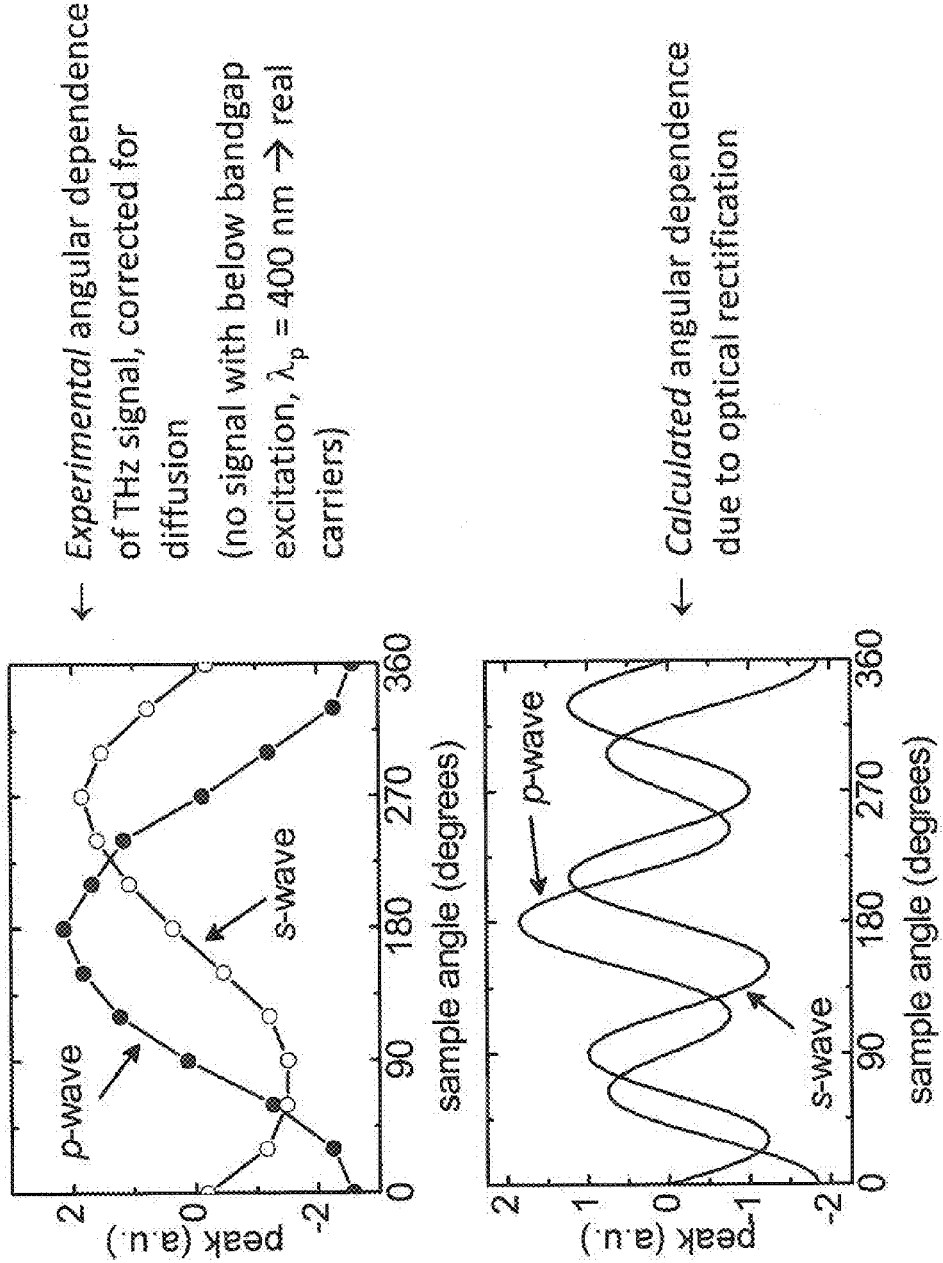
FIG. 29 is a graphical illustration depicting the experimental sample rotation dependence of the THz signal amplitude in comparison to the calculated sample rotation angle dependence due to optical rectification.

The sample rotation angle-dependent THz signal from the high SF density m-plane GaN epilayer revealed that the in-plane polarization of the wurtzite crystalline structure is terminated by stacking faults, which introduce thin zincblende domains at which charge accumulation leading to strong electric fields parallel to the c-axis of the crystal occurs, as shown in FIG. 8 of U.S. application Ser. No. 12/435,797. In-plane transport of photoexcited carriers proceeds parallel to the electric field, leading to the THz radiation polarized preferentially along this axis of the sample. This mechanism provided the 360 degree oscillatory component of the THz amplitude as a function of sample angle. Rotating the c-axis by 180 degrees also rotates the direction of the built-in field by 180 degrees and causes the photoexcited carriers to accelerate in the opposite direction. A reversal of the photoexcited carrier acceleration direction is observed as a flip in the THz waveform polarity, as seen in the THz signal from the high SF density m-plane GaN depicted in FIG. 22. The sinØ dependence of and 90° shift between the p-and s-polarization curves (inset in FIG. 22) indicates that the linearly polarized THz emission associated with in-plane carrier transport rotates with sample rotation. No optical rectification is observed; evidence of nonlinear polarization would appear as a sin(nØ) (where n>1) dependence of the THz signal, as shown in the calculated THz signal due to optical rectification displayed in the lower graph in FIG. 29. Moreover, no dependence on pump polarization is found after accounting for absorption, and the THz signal vanishes for 400 nm excitation, indicating that the signal is associated with the generation and transport of real carriers.

In the inset of FIG. 22, the p-polarized curve is corrected for the surface normal transport contribution.

The offset which appears as a phase and amplitude asymmetry observed for the p-polarized THz waveforms from the high-SF-density m-plane GaN sample (FIG. 25B) emanates from the vertical, diffusion-driven transport, which does not depend upon sample rotation, and is also responsible for the angle independent p-polarization signal found for the SF-free sample (FIG. 23).

Terahertz emission from high stacking fault density m-plane GaN is achieved using ultrafast pulse excitation. As observed in the inset of FIG. 22, the terahertz signal exhibits a substantially 360° periodicity with sample rotation and a polarity flip when the c-axis is rotated by 180°, characteristic of real carrier transport in an in-plane electric field parallel to the c-axis induced by stacking fault-terminated internal polarization at wurtzite domain boundaries. The terahertz emission conducted according to the principles of the present invention potentially may be enhanced by several times relative to that from a stacking fault-free m-plane GaN sample, for which the terahertz signal emanates from surface surge-currents and diffusion-driven carrier transport normal to the surface and is independent of the c-axis orientation.

Evidence of internal electric fields induced by stacking fault (SF)-terminated internal polarization in polar crystals has been observed in ZnS, ZnTe, and SiC and predicted in GaN. In semipolar or nonpolar wurtzite crystals, for which there is a projection of the c-axis in-plane, the stacking fault induced electric fields associated with the termination of the internal polarization along the polar [0001] direction at wurtzite domain boundaries also have an in-plane component. The high fields within the wurtzite domains terminated by the stacking faults substantially point in the same direction, effectively creating an array of contactless PC switches that could significantly enhance THz emission from semiconductor surfaces under ultra short pulse excitation.

In accordance with the invention described in U.S. application Ser. No. 12/435,797 enhanced THz emission induced by femtosecond ultraviolet pulses can be obtained from high stacking fault density nonpolar GaN. This is attributed to the THz radiation from an m-plane ($1\bar{1}00$) GaN epilayer with a SF density of $1 \times 10^6$ cm$^{-1}$ emanating from the drift of photo-excited carriers in strong built-in electric fields created by SF-terminated internal polarization at wurtzite domain boundaries. The THz signal exhibits a 360° periodicity with sample rotation and a polarity flip when the c-axis is rotated by 180°, characteristic of real carrier transport in an in-plane electric field parallel to the c-axis, which is not observed in the emission from a SF-free m-plane GaN substrate, in which THz emission is governed by carrier diffusion or surface surge-currents normal to the surface. Comparison of the THz emission from the stacking fault and stacking fault-free samples indicated that the component attributed to in-plane transport dominates that from surface normal transport, even for high excess electron energies and short absorption lengths favorable to diffusive transport.

Figure 28:
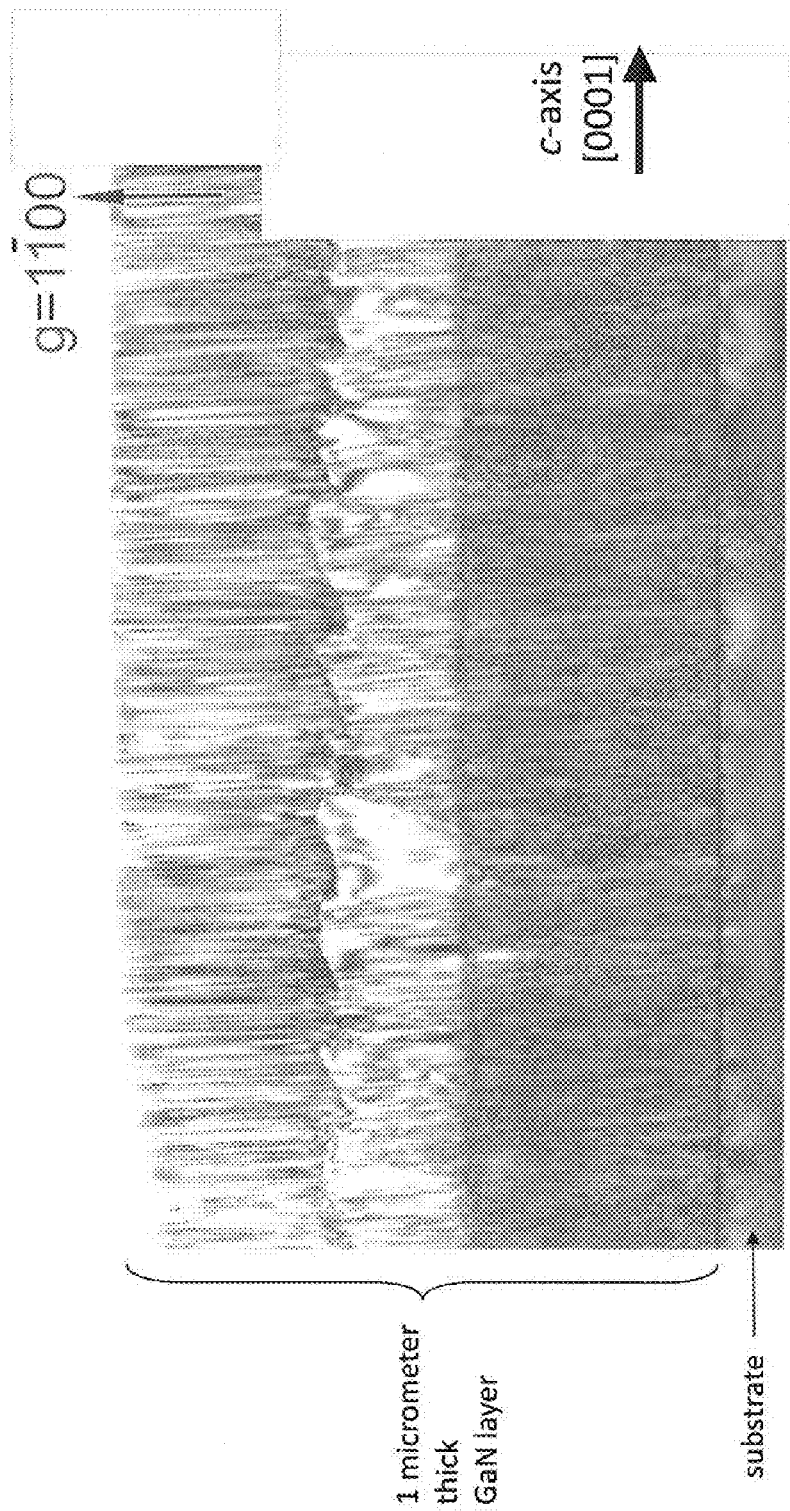
FIG. 28 is a transmission electron microscopy image of the high stacking fault density m-plane GaN sample showing the [11$\bar{2}$0] cross-section recorded in a g =1$\bar{1}$00 two-beam condition. Stacking faults appear as dark vertical lines across the sample.

Shown in FIG. 28 is an approximately 1 μm-thick high stacking fault-density m-plane GaN epilayer which was grown by metalorganic chemical vapor deposition (MOCVD) on an m-plane 6H—SiC substrate with an AlN nucleation layer. FIG. 28 shows the cross-sectional transmission electron microscopy (TEM) image of the film in which basal plane stacking faults (BPSFs) are visible as dark lines running perpendicular to the c-axis ([0001] direction). In studies conducted, it was determined that by scattering contrast TEM imaging that the majority of the stacking faults in this film are $I_1$ type, which corresponds to a stacking sequence of the (0001) basal planes of . . . ABABABCBCBCB . . . as shown in application Ser. No. 12/435,797 (FIG. 7). The stacking faults result primarily from the large density of structural defects associated with heteroepitaxial growth on lattice-mismatched substrates.

For comparison purposes, the stacking fault free m-GaN is a ~330 μm-thick substrate from Mitsubishi Chemical Co., Ltd.® The samples were optically excited using ~150 fs pulses obtained from the third harmonic (266 nm) and second harmonic (400 nm) of a 250 kHz Coherent regenerative amplifier (RegA) at 800 nm, as well as from the frequency doubled signal beam (350 nm) of an optical parametric amplifier pumped by the RegA. The pump beam was incident on the GaN sample at approximately 45° to the surface normal (as depicted in FIG. 2A), and the subsequent THz emission is collected with a pair of parabolic mirrors for polarization sensitive ZnTe-based electro-optic sampling, as illustrated in, inter alfa, FIG. 10.

FIG. 25A and 25B show the time-resolved (a) s-and (b) p-polarized THz signal from the high SF-density m-plane GaN epilayer at different sample rotation angles for 266 nm excitation. The terms p-and s-polarization refer to the polarization of the THz signal parallel and perpendicular to the plane of incidence, respectively. At Ø=0°, the c-axis of the nonpolar sample is in the plane of incidence. As displayed in FIGS. 25A (25B), the measured s-polarized (p-polarized) THz waveform polarity flips as the sample rotates, reaching a peak positive signal at Ø=270° (180°) and a peak negative signal at Ø=90° (0°) when the c-axis is parallel or antiparallel to the s-polarization (p-polarization) detection direction, respectively. Note that the peak positive signal (Ø=180°) of the p-polarized THz signal (FIG. 25B) is larger than the peak negative signal (Ø=0°), and the phase appears to shift as the sample rotates. In contrast, the p-polarized THz waveform from the SF-free m-plane GaN shown in FIG. 23 has no dependence on sample rotation angle, and no s-wave component is observed from this sample. The angle independent p-polarization from the stacking fault free material emanates from similar surface normal photocurrents found in c-plane InN and InAs which does not depend upon sample rotation. Although this signal is expected to be large due to the high excess electron energy (~1 eV) and small absorption depth (<50 nm) for 266 excitation, the THz emission from high stacking fault density sample is enhanced by nearly a factor of 3 (FIG. 20) due to the component associated with in-plane transport. This enhancement factor increases to ~7 for 350 nm excitation (FIG. 21) as the component of the THz emission emanating form the in-plane transport remains robust, while the signal associated with the diffusion component of surface normal currents becomes smaller, as expected for the lower excess electron energy (<100 meV) and increased absorption depth (~100 nm).

Surface normal transport is also responsible for the phase shift and amplitude symmetry among the p-polarized THz waveforms from the high stacking fault density m-plane GaN sample (FIG. 25B). To analyze only the in-plane transport, the normal photocurrent component can be separated from the in-plane drift component by rotating the c-axis of the crystal perpendicular to the p-polarization detection direction (FIG. 34). In this orientation, the in-plane drift contribution is not detected, and only the surface normal transport signal is measured. The p-polarized THz waveforms from the high SF-density m-plane GaN at various sample rotation angles can then be corrected for the surface normal transport contribution, which is independent of the c-axis orientation, to extract only the in-plane drift component. FIG. 34 displays the p-polarized THz waveform at Ø=0° with and without removing the surface normal transport component, which has a slightly different phase than the in-plane drift contribution. After removing the normal photocurrent contribution, the phase shift and amplitude asymmetry between the peak positive and peak negative p-polarized THz signals (FIG. 25B) noted above are eliminated and the corrected p-polarized THz waveforms (FIG. 34) resemble the s-polarized THz waveforms in FIG. 25A. Based on the analysis of the amplitude asymmetry in FIG. 25B and the orientation of the c-axis, one can also determine that the electrons accelerate in the [000$\bar{1}$] direction, consistent with carrier transport in built-in, in-plane electric fields created by SF-terminated internal polarization at wurtzite domain boundaries.

In application Ser. No. 12/435,797, the in-plane polarization of the wurtzite crystalline structure is terminated by stacking faults, creating an interface and charge accumulation leading to the occurrence of strong electric fields parallel to the c-axis of the crystal. In-plane transport of photoexcited carriers proceeds parallel to the electric field, leading to a THz radiation component polarized preferentially along this axis of the sample. Rotating the c-axis by 180° also rotates the direction of the built-in field by 180°, causing the photoexcited carriers to accelerate in the opposite direction. A reversal of the photoexcited carrier acceleration direction is observed as a flip in the THz waveform polarity, as seen in the THz signal from the high SF density m-plane GaN in FIGS. 22, 25A, and 25B.

In summary, the present invention provides, inter alfa, enhanced THz emission from, for example, nonpolar GaN due to carrier transport in internal in-plane electric fields created by the termination of the in-plane polarization in wurtzite domains at the boundaries 21, 22.

As described in application Ser. No. 12/435,797, for the special case using stacking faults, the estimated, maximum average in-plane electric field of ~290 kV/cm in the wurtzite regions for an $I_1$ type SF density of $1\times10^6$ $cm^{-1}$ is comparable to the bias fields applied to PC switches using low-temperature grown GaAs, one of the best PC materials, but does not require electrode processing or an external bias. Comparison with THz emission from SF-free m-plane GaN indicates that the THz signal from SF-related in-plane carrier transport dominates that usually observed from carrier diffusion or surface surge-currents normal to the sample surface, even for high excess electron energies and short absorption lengths favorable to diffusive transport.

Figure 30:
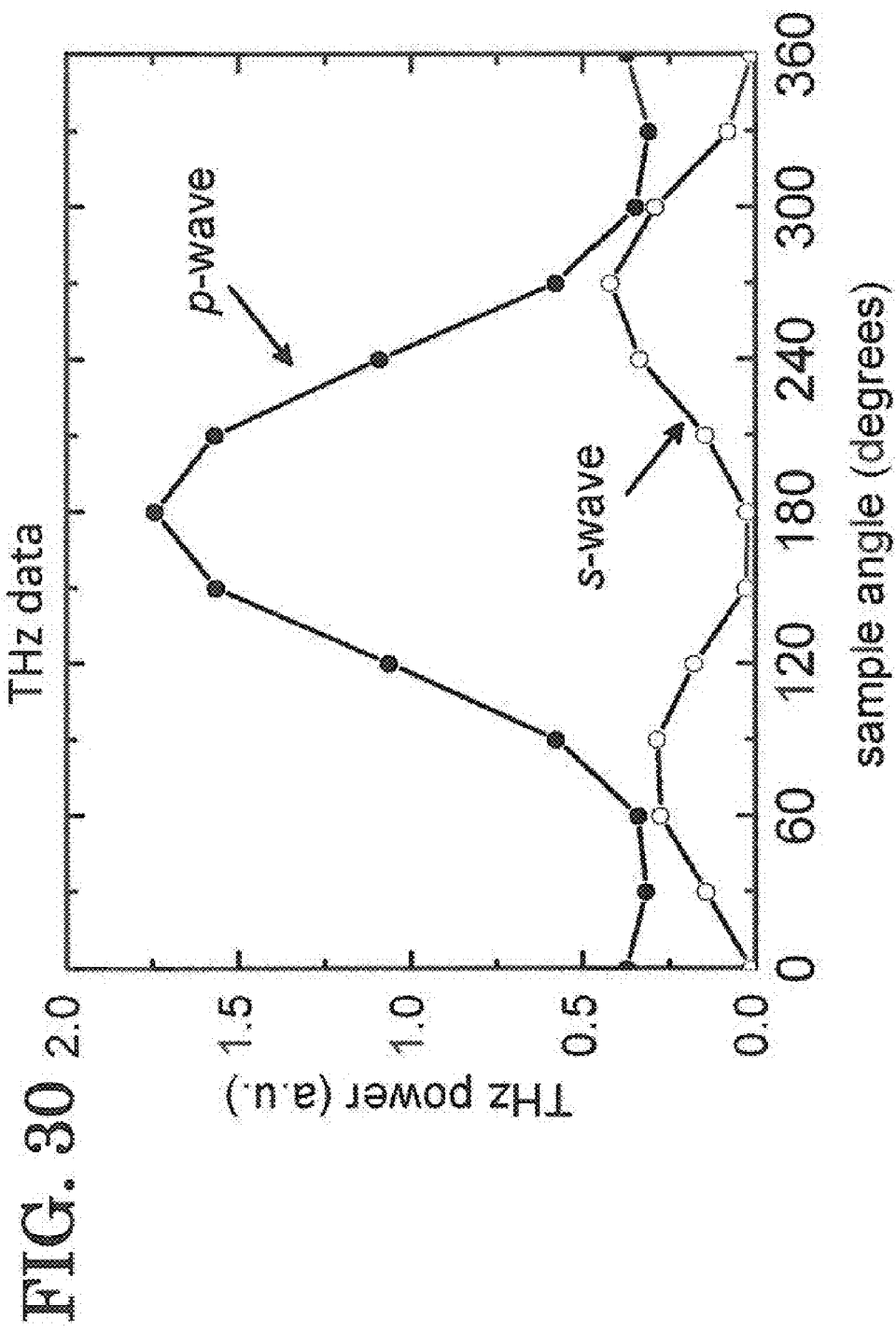
FIG. 30 is a graphical illustration showing the terahertz radiation power for the p-wave and s-wave components versus sample angle. Note that the maximum THz radiation power occurs for p-wave component at 180 degrees.
Figure 31:
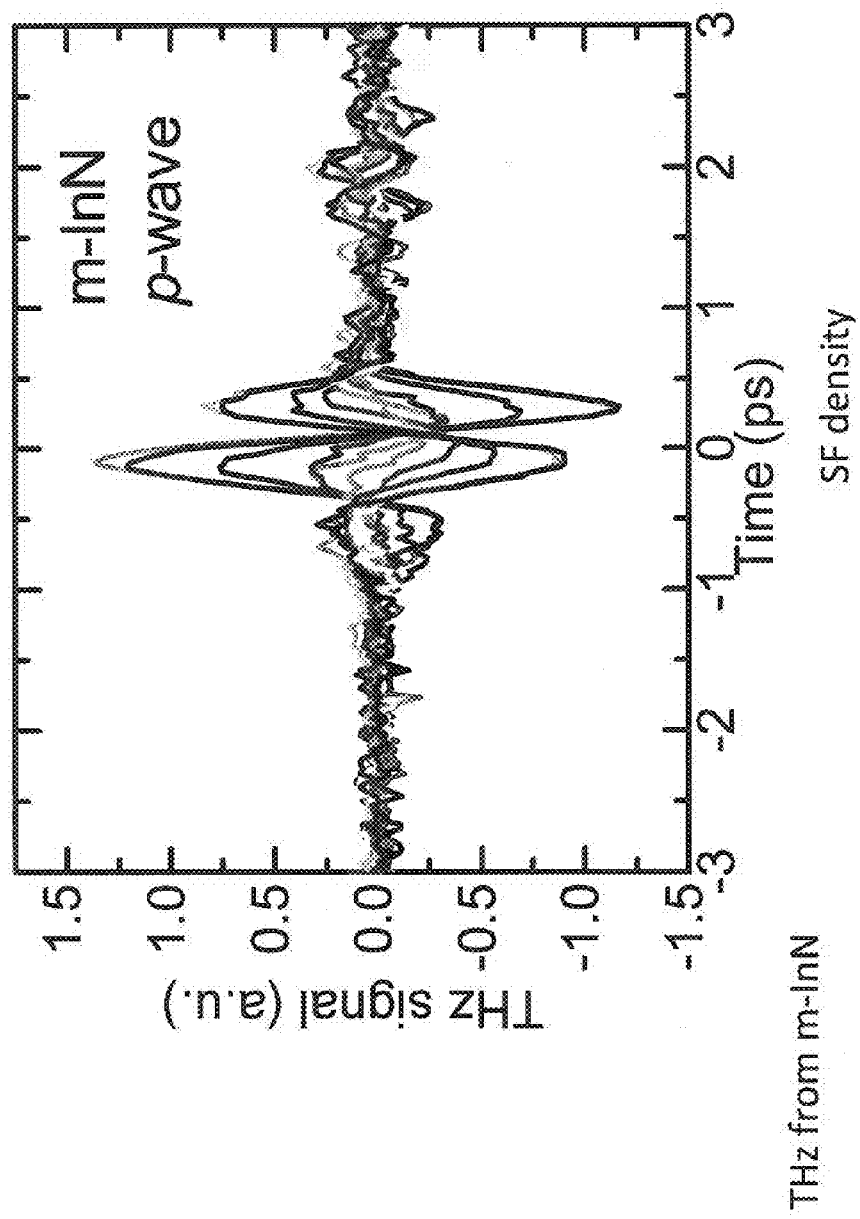
FIG. 31 is a graphical illustration of time-resolved p-wave THz signal amplitude from an m-plane InN epilayer at sample rotation angles ranging between 0° to 360°. The sample is excited with femtosecond laser pulses at 800 nm.

As described in application Ser. No. 12/435,797, for the special case using stacking faults, the maximum enhancement of the THz power from high SF density m-plane GaN occurs for p-polarized THz radiation when the c-axis is at 180 degrees, as displayed in FIG. 30. The THz power is the square of the time-integrated THz signal amplitude. The orientation of the c-axis is in the plane of incidence and aligned antiparallel to the projection of the excitation laser propagation direction onto the sample surface (FIG. 2A).

Figure 32:
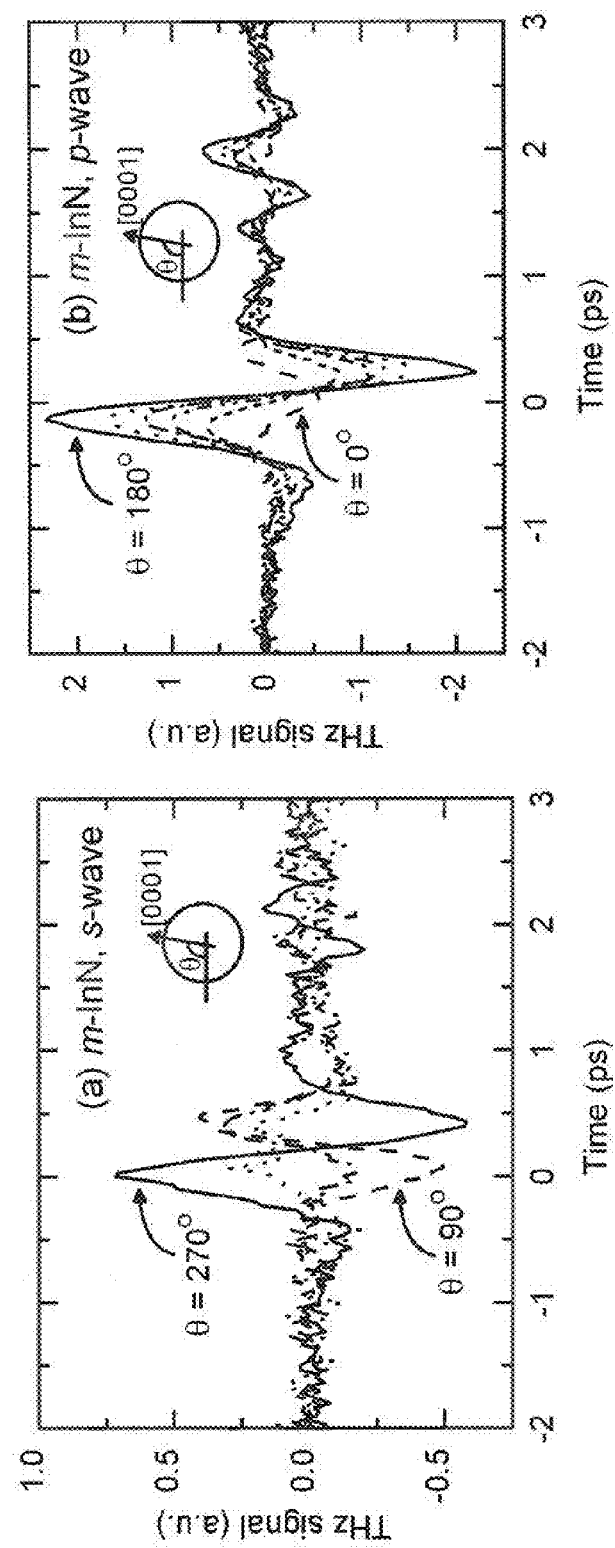
FIG. 32 is a graphical illustration of time-resolved (a) s-wave and (b) p-wave THz emission from an m-plane InN epilayer; the units for the p-wave being approximately twice that of the s-wave component. Note that the maximum THz signal intensity occurs for the p-wave component at 180°.

As described in application Ser. No. 12/435,797, for the special case using stacking faults, FIG. 32 shows (a) s-polarized and (b) p-polarized THz radiation from high SF density m-plane InN at sample rotation angles ranging from 0 degrees to 360 degrees. The measured s-polarized (p-polarized) THz waveform exhibits a polarity flip as the c-axis rotates, reaching a positive peak signal at Ø=270° (Ø=180°) and a negative peak signal at Ø=90° (Ø=0°), similar to the THz signal from high SF density m-plane GaN (FIGS. 25A and 25B).

Figure 33:
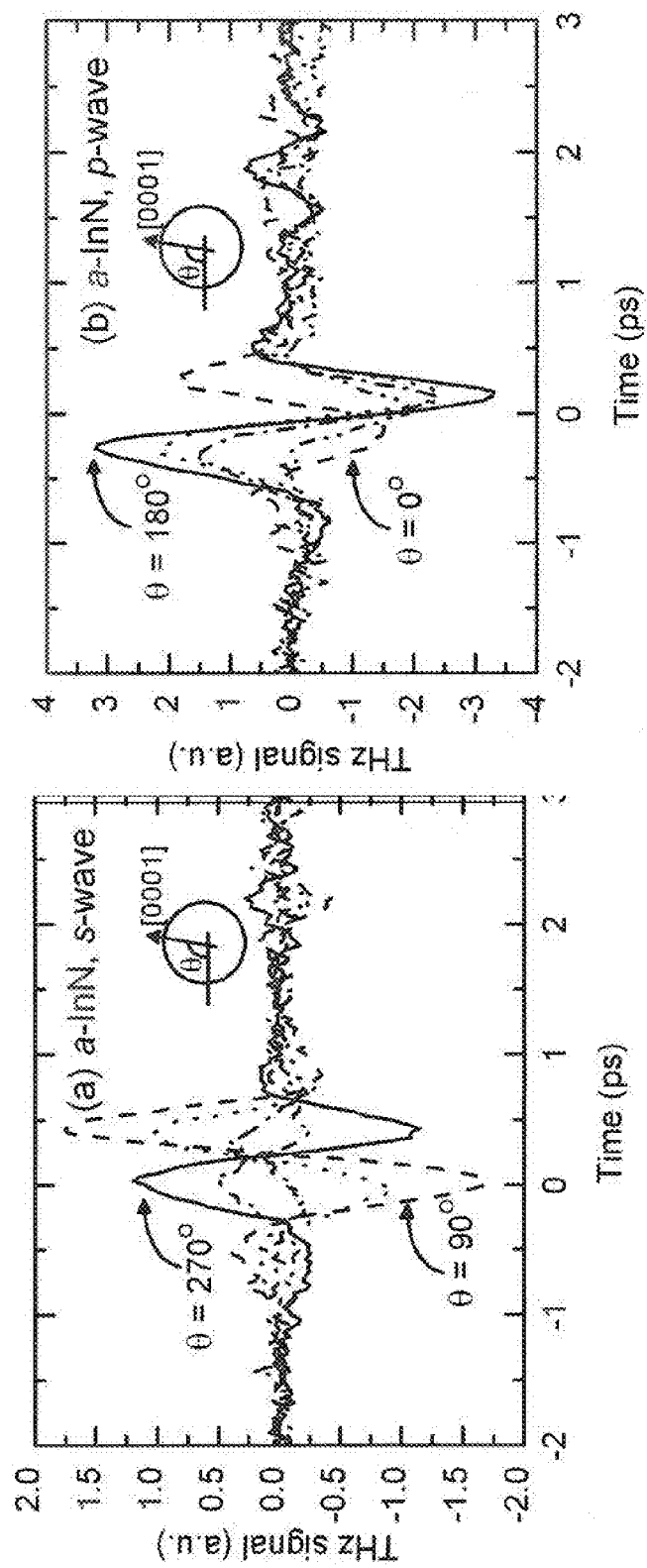
FIG. 33 is a graphical illustration of time-resolved THz emission for an a-plane InN; showing the p-wave and s-wave components; the units for the p-wave being approximately twice that of the s-wave component. Note that the maximum THz signal intensity occurs for the p-wave component at 180°.

As described in application Ser. No. 12/435,797, for the special case using stacking faults, FIG. 33 shows (a) s-polarized and (b) p-polarized THz radiation from high SF density a-plane InN at sample rotation angles ranging from 0 degrees to 360 degrees. The measured s-polarized (p-polarized) THz waveform exhibits a polarity flip as the c-axis rotates, reaching a positive peak signal at Ø=270° (Ø=180°) and a negative peak signal at Ø=90° (Ø=0°), similar to the THz signal from high SF density m-plane GaN (FIGS. 25A and 25B) and InN (FIG. 32).

The term stacking fault as used herein and as described in application Ser. No. 12/435,797, means, for example, in situations where there are AB AB AB then any derivation from this order as well as any change in A or B is a stacking fault. It is also possible to have Zinc Blende and then have wurtzite as a stacking fault. However, wurtzite is a lower energy state than cubic for nitride semiconductors and tends to stay that way.

The terminology "outcoupling" as used herein refers to radiation going from one medium (such as a semiconductor) to another (such as air). The term "projection" as used in the following claims refers to a mathematical model vector projection.

The terminology "in-plane" as used herein refers to a direction, such as carrier transport, lying in the surface plane of the polar crystal material.

The terminology polarization of the emitted THz radiation relates to the direction of the electric field vector of the propagating THz wave.

The terminology "nonsaturation region" used in relation to the pump power range refers to the operation range in which there is a constant ratio of terahertz emission out per excitation photons inputted.

As used in the following claims, the term "device" is not intended to be limiting and includes an apparatus or system for producing terahertz radiation. Systems or devices of this nature are represented, for example, in FIGS. 10-13.

The terminology "layer" as used in the following claims is not intended to be limiting; including as to size or dimension. The "layer" as used in the claims may be part of a composite or the "layer" may be a part of a uniform material.

The terminology "zincblende" or "zinc blende" refers to the crystal structure named after the mineral zincblende (sphalerite), but is inclusive of a number of crystal compounds. Examples of compounds with this structure include many compound semiconductors (such as gallium arsenide and cadmium telluride), and a wide array of other binary compounds.

The terminology "formed on" when used in conjunction with a substrate means either to form an element or elements on the substrate in addition to the substrate or to use portions of the substrate to form the element(s).

As used herein, the terminology "edge" means to a border or boundary of a segment which need not be linear or of any particular configuration. The term edge is used to describe an interface of a segment with air, a vacuum or another material. The edge need not be a sharp edge and may be rounded and/or irregular.

It should be emphasized that the above-described embodiments are merely possible examples of implementations. Although various preferred embodiments of the present invention have been described herein in detail to provide for complete and clear disclosure, it will be appreciated by those skilled in the art, that variations may be made thereto without departing from the spirit of the invention. Many variations and modifications may be made to the above-described embodiments. All such modifications and variations are intended to be included herein within the scope of the disclosure and protected by the following claims.

The invention claimed is:

1. A device for generating terahertz radiation comprising:
a substrate;
a plurality of segments of polar crystal material formed on the substrate, the segments having an internal electric polarization; each segment comprising at least two edges oriented substantially perpendicular to the polar axis such that the electric polarization terminates at the edges and the segment comprises a majority of positive charges on one edge and a majority of negative charges on the opposite edge thereby leading to creation of an internal electric field;
whereby when irradiated by a pulsed source of duration less than one picosecond, electron-hole pairs are generated within the segments and the internal electric field separates and accelerates the electron-hole pairs to thereby produce terahertz radiation.

2. The device of claim 1 wherein the distance between the two edges is less than 1 micron and wherein the distance is such that the electron potential difference between the two edges does not exceed the bandgap in electron volts of the material, and wherein the segments are formed at densities of between $10^3$/cm to $10^7$/cm.

3. The device of claim 1 wherein the internal electric field has a component greater than approximately 10 kV/cm substantially perpendicular to the edges and substantially parallel to the surface of the segments such that electron-hole pairs created by the pulsed source separate and accelerate substantially parallel to the polar crystal material surface leading to the efficient outcoupling of the THz radiation, and wherein the terahertz radiation is produced without formation of metal contacts or application of a large external voltage.

4. The device of claim 1 wherein the pulsed source is one of a pulsed light, electron, or ionizing particle source.

5. The device of claim 1 wherein the edges interface with one of a vacuum, air, or a other material, whereby when the segments are pulsed by the pulsed source, the electron-hole pairs thereby created separate and accelerate in the internal electric fields created by the termination of the polar crystal material at the interface with one of a vacuum, air or other material to thereby generate terahertz radiation without the application of an external voltage.

6. The device of claim 1 wherein the substrate comprises polar crystal material and the plurality of segments of polar crystal material are formed by removing material from the substrate to form the edges.

7. The device of claim 1 wherein the edges of the segments are formed by walls inclined or substantially perpendicular to the surface of the substrate.

8. The device of claim 1 wherein the plurality of segments are formed by etching the polar crystal material.

9. The device of claim 1 wherein piezoelectric polarization is created by lattice mismatched induced strain between the polar crystal material of a segment and the substrate and/or at least two segments stacked on top of one another.

10. The device of claim 1 wherein the polar crystal material is wurtzite material and wherein the edges result in the termination of the spontaneous and piezoelectric internal electric polarization, and wherein the surface of the polar crystal material forming the segments is one of
  a nonpolar wurtzite crystal plane, or
  a semipolar wurtzite crystal plane, the semipolar wurtzite crystal plane oriented such that there is a projection of the polar axis on the surface.

11. The device of claim 1 wherein the polar crystal material is zinc blende material under strain and wherein the edges result in the termination of piezoelectric internal electric polarization, and wherein the surface of the polar crystal material forming the segments is such that there is a projection of the polar axis on the surface.

12. The device of claim 1 wherein the polar crystal material is GaN, InN, AlN, BN or alloys thereof, ZnO, MgO, ZnS, ZnSe, ZnTe, or alloys thereof or GaAs, InAs, AlAs, InN, GaN, AlN, GaSb, AlSb, InSb or alloys thereof, or SiC.

13. The device of claim 1 wherein the plurality of segments of polar crystal material are formed on the substrate are grown on a substrate in a manner such that growth proceeds in one of
  a nonpolar direction, with the polar crystal material's polar axis in the growth plane, or
  a semipolar direction, with a projection of the polar axis in the growth plane.

14. The device of claim 1 wherein the propagation direction of the pulsed source and the emitted terahertz radiation define a plane of incidence relative to a surface of the polar crystal material, the polar axis of the polar crystal material lying within the plane of incidence and having a projection parallel to the surface, and a projection of the pulsed radiation source propagation direction onto the surface is antiparallel to the in-plane projection of the polar axis.

15. A method generating terahertz radiation utilizing polar crystal material comprising:
  forming a plurality of polar crystal material segments on a substrate, the segments having an internal electric polarization; each segment comprising at least two edges oriented substantially perpendicular to the polar axis such that the electric polarization terminates at the edges and the segment comprises a majority of positive charges on one edge and a majority of negative charges on the opposite edge thereby leading to creation of an internal electric field;
  irradiating the plurality of segments using a pulsed source having a pulse duration of less than one picosecond to generate electron-hole pairs within the segments such that the internal electric field separates and accelerates the electron-hole pairs to thereby produce terahertz radiation.

16. The method of claim 15 wherein the step of forming a plurality of polar crystal material segments comprises growing the polar crystal material on a lattice mismatched substrate to thereby purposely create piezoelectric polarization.

17. The method of claim 15, wherein the step of irradiating the plurality of segments comprises propagating a pulsed radiation, electron, or ionizing particle source at a direction in a plane of incidence relative to the surface of the polar crystal material segments such that a projection of the pulsed radiation source propagation direction onto the polar crystal surface is antiparallel to the in-plane projection of the polar axis.

18. The method of claim 15 wherein the internal electric field has a component greater than approximately 10 kV/cm substantially perpendicular to the edges and substantially parallel to the surface of the segments such that electron-hole pairs created by the pulsed source separate and accelerate substantially parallel to the polar crystal material surface leading to the efficient outcoupling of the THz radiation, and wherein the terahertz radiation is produced without formation of metal contacts or application of a large external voltage.

19. The method of claim 15 wherein the terahertz signal produced exhibits a 360 degree periodicity with sample rotation and a flip of the terahertz waveform polarity results from rotating the c-axis by 180 degrees which also rotates the direction of the built-in electric field by 180 degrees causing the photoexcited carriers to accelerate in the opposite direction.

20. The method of claim 15 wherein the crystal material comprises GaN, InN, AlN, BN or alloys thereof, ZnO, MgO, ZnS, ZnSe, ZnTe, or alloys thereof or GaAs, InAs, AlAs, InN, GaN, AlN, GaSb, AlSb, InSb or alloys thereof, or SiC and wherein the crystal material is irradiated using a pulsed radiation source with an energy in the approximate range of 1 to 25 nano-joules, a wavelength of 200-1800 nanometer, and a pulse duration in the approximate range of 10 to 300 femtoseconds, a pump beam spot size in the approximate range 0.5 to 2 millimeters, and an angle of incidence in the approximate range of 30 to 60 degrees.

21. An apparatus for generating terahertz radiation comprising:
  a substrate;
  a plurality of segments of polar crystal material formed on the substrate, the segments having an internal electric polarization; each segment comprising a plurality of boundaries oriented substantially perpendicular to the polar axis at which the internal electric polarization terminates thereby leading to creation of an internal electric field;
  whereby, when irradiated by a femtosecond pulsed source, electron-hole pairs within the segment are separated and accelerated by the internal electric field thereby producing terahertz radiation.

* * * * *